US008443082B2

(12) United States Patent
Nguyen

(10) Patent No.: US 8,443,082 B2
(45) Date of Patent: May 14, 2013

(54) NETWORK COMMUNICATION SYSTEMS AND METHODS

(75) Inventor: Hien Van Nguyen, Chantilly, VA (US)

(73) Assignee: Interactive Social Internetworks, LLC, Falls Church, VA (US)

( * ) Notice: Subject to any disclaimer, the term of this patent is extended or adjusted under 35 U.S.C. 154(b) by 0 days.

(21) Appl. No.: 13/407,411

(22) Filed: Feb. 28, 2012

(65) Prior Publication Data

US 2012/0221726 A1 Aug. 30, 2012

Related U.S. Application Data

(60) Provisional application No. 61/447,495, filed on Feb. 28, 2011, provisional application No. 61/473,600, filed on Apr. 8, 2011.

(51) Int. Cl.
*G06F 15/16* (2006.01)
*G06F 12/00* (2006.01)

(52) U.S. Cl.
USPC ........................................... 709/225; 709/250

(58) Field of Classification Search .......... 709/223–229, 709/246, 250
See application file for complete search history.

(56) References Cited

U.S. PATENT DOCUMENTS

| | | | |
|---|---|---|---|
| 6,169,802 B1 * | 1/2001 | Lerner et al. ..................... 380/44 | |
| 6,288,716 B1 * | 9/2001 | Humpleman et al. ........ 715/733 | |
| 6,614,781 B1 | 9/2003 | Elliott | |
| 6,795,444 B1 | 9/2004 | Vo | |
| 7,363,381 B2 | 4/2008 | Mussman | |
| 7,372,957 B2 | 5/2008 | Strathmeyer | |
| 7,424,615 B1 | 9/2008 | Jalbert et al. | |
| 7,577,156 B2 | 8/2009 | Signaoff | |
| 7,647,377 B2 * | 1/2010 | Yamade ........................ 709/206 |
| 7,773,546 B2 * | 8/2010 | Rajakarunanayake et al. ............................. 370/278 |
| 8,224,918 B2 * | 7/2012 | McCarthy et al. ............ 709/206 |
| 8,380,982 B2 * | 2/2013 | Miyabayashi et al. ........ 713/156 |
| 2007/0036155 A1 | 2/2007 | Huang |
| 2007/0167167 A1 | 7/2007 | Jiang |
| 2008/0151872 A1 | 6/2008 | Chen |
| 2008/0192770 A1 | 8/2008 | Burrows |
| 2009/0044022 A1 | 2/2009 | Singh |
| 2009/0164553 A1 | 6/2009 | Chiu |
| 2010/0172344 A1 | 7/2010 | Yin |
| 2010/0273424 A1 | 10/2010 | De Petris et al. |
| 2011/0029778 A1 | 2/2011 | Garcia et al. |

OTHER PUBLICATIONS

International Search Report issued in PCT/US2012/02698 dated Sep. 27, 2012.

(Continued)

*Primary Examiner* — Zarni Maung
(74) *Attorney, Agent, or Firm* — DLA Piper LLP (US)

(57) ABSTRACT

Systems and methods for communicating via a network may employ communication devices capable of functioning in a server mode and a client mode. Communication may begin by activating a server mode for a first communication device. The first communication device in the server mode may receive a message from a second communication device, the message comprising an identity associated with the second communication device. The first communication device may retrieve a key associated with the second communication device and verify the identity associated with the second communication device by comparing data in the message from the second communication device with data in the key. A client mode may be activated for the first communication device. The first communication device in client mode may send a message to an address associated with the second communication device, the message comprising an identity associated with the first communication device.

46 Claims, 37 Drawing Sheets

OTHER PUBLICATIONS

Written Opinion of the International Searching Authority issued in PCT/US2012/02698 dated Sep. 27, 2012.
Ciminiera, I. et al., "Distributed Connectivity Service for a SIP Infrastructure," IEEE Netwrok, Sep./Oct. 2008, pp. 33-40.
Seedorf, J. Security Challenges for Peer-to-Peer SIP, IEEE Network, Sep./Oct. 2006, pp. 38-45.
Lin, Ying-Dar, et al. "How NAT-Compatible Are VoIP Applications?", IEEE Communications Magazine, Dec. 2010, pp. 58-65.
L. Zhang, "A Retropective View of Network Address Translation." IEEE Network, Sep./Oct. 2008, pp. 8-12.
A. Muller et al., Behavior and Classification of NAT Devices and Implications for NAT Traversal,: IEEE Netwrok, Sep./Oct. 2008, pp. 14-19.
J. Rosenberg et al., "SIP : Session Initiation Protocol," Network Working Group, Request for Comments: 3261, Jun. 2002.
J. Kuthan, et al. "SIP: More Than You Ever Wanted to Know About," Tekelec, Mar. 2007.
D. Barron, "SIP Basics: CSG VoIP Workshop," Massachusetts Institute of Technology, Jan. 5, 2005.
C. Sibley, "IP PBX/Serviee Provider Interoperability: SIP connect 1.0 Technical Recommendation," SIP Connect, SIP Forumn, 2008.
S. Dawkins, "SIP-PBX/Service Provider Interoperability: SIPconnect 1.1 Technical Recommendation," SIP Connect, SIP Forumn. 2011.
T. Zourzouvillys et al., "An Introduction to Standars-Based VoIP: SIP, RTP, and Friends," IEEE Computer Society, Mar./Apr. 2010, pp. 69-73.
H. Schulzrinne et al., "The Session Intiation Protocol: Internet-Centric Signaling", Advanced Signaling and Control in Next Generation Networks, IEEE Communications Magazine, Oct. 2000, pp. 134-141.
JavaTM Secure Socket Extension (JSSE) Reference Guide for JavaTM Platform Standard Edition 6, http://docs.oracle.com/javase/6/docs/technotes/guides/security/jsse/JSSERefGuide.html.
JavaTM PKI Programmer's Guide, http://docs.oracle.com/javase/6/docs/technotes/guides/security/certpath/CertPathProgGuide.html.
Java™ Cryptography Architecture (JCA) Reference Guide for JavaTM Platform Standard Edition 6 http://docs.oracle.com/javase/6/docs/technotes/guides/security/crypto/CryptoSepc.html.
B. Ford et al., "Peer-to-peer communication across network address translation," MIT, tech. rep., Apr. 14, 2005 (Power Point Presentation).
B. Ford et al., "Peer-to-peer communication across network address translation," MIT, tech. rep., 2005.
D. Wing, "Network address translation extending the Internet address space," IEEE Internet computing, Jul./Aug. 2010.
C. Boulton et al., "NAT traversal practices for client-server SIP," RFC6314, Jul. 2011.
S. Farrell. "Not reinventing PKI until we have something better," IEEE Internet Computing, Sep./Oct. 2011.
G. Kessler, "An overview of cryptography," http://www.garykessler.net/library/crypto.html, May 2011.
Schulzrinne, H., Casner, S., Frederick, R., and V. Jacobson, "RTP: A Transport Protocol for Real-Time Applications", STD 64, RFC 3550, Jul. 2003.
Huitema, C., "Real Time Control Protocol (RTCP) attribute in Session Description Protocol (SDP)", RFC 3605, Oct. 2003.
Handley, M., Jacobson, V., and C. Perkins, "SDP: Session Description Protocol", RFC 4566, Jul. 2006.
Johnston. A., Ed., Sparks, R., Cunningham, C., Donovan, S., and K. Summers, "Session Initiation Protocol Service Examples", BCP 144, RFC 5359, Oct. 2008.
Boulton, C., Rosenberg, J., Camarillo, G., and F. Audet, "NAT Traversal Practices for Client-Server SIP", RFC 6314, Jul. 2011.
Audet, F. and C. Jennings, "Network Address Translation (NAT) Behavioral Requirements for Unicast UDP", BCP 127, RFC 4787, Jan. 2007.
Rosenberg, J., "Interactive Connectivity Establishment (ICE): A Protocol for Network Address Translator (NAT) Traversal for Offer/Answer Protocols", RFC 5245, Apr. 2010.
Rosenberg, J Mahy, R., Matthews, P., and D. Wing, "Session Traversal Utilities for NAT (STUN)", RFC 5389, Oct. 2008.
Jennings, C., Mahy, R., and F. Audet, "Managing Client-Initiated Connections in the Session Initiation Protocol (SIP)", RFC 5626, Oct. 2009.
Perkins, C. and M. Westerlund, "Multiplexing RTP Data and Control Packets on a Single Port", RFC 5761, Apr. 2010.
Mahy, R., Matthews, P., and J. Rosenberg, "Traversal Using Relays around NAT (TURN): Relay Extensions to Session Traversal Utilities for NAT (STUN)", RFC 5766, Apr. 2010.
Cooper, D., Santesson, S., Farrell, S., Boeyen, S.,Housley, R., and W. Polk, "Internet X.509 Public Key Infrastructure Certificate and Certificate Revocation List (CRL) Profile", RFC 5280, May 2008.
Dierks, T. and C. Allen, "The TLS Protocol Version 1.0", RFC 2246, Jan. 1999.
Dierks, T. and E. Rescorla, "The Transport Layer Security (TLS) Protocol Version 1.1", RFC 4346, Apr. 2006.
Dierks, T. and E. Rescorla, "The Transport Layer Security (TLS) Protocol Version 1.2", RFC 5246, Aug. 2008.
Rekhter, Y., Moskowitz, R., Karrenberg, D., Groot, G., and E. Lear, "Address Allocation for Private Internets", BCP 5, RFC 1918, Feb. 1996.

\* cited by examiner

405

NETWORK COMMUNICATION SYSTEMS AND METHODS

CROSS-REFERENCE TO RELATED APPLICATIONS

This disclosure claims priority from U.S. Provisional App. Ser. No. 61/447,495, entitled "Secured network services and scalable architecture of inter-carrier interface," filed Feb. 28, 2011 and U.S. Provisional App. Ser. No. 61/473,600, entitled "Secure network services and scalable architecture of inter-carrier interface," filed Apr. 8, 2011, the entirety of each of which is incorporated by reference herein.

DETAILED DESCRIPTION OF SEVERAL EMBODIMENTS

Systems and methods for using inter-carrier interfaces (ICIs) to enable communication devices, such as Internet protocol (IP) compatible devices, to communicate with one another are described herein. In some embodiments, communication devices used with an ICI may be computers. A computer may be any programmable machine capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, and other terms. It will be understood by those of ordinary skill that those terms used herein are interchangeable, and any computer capable of performing the described functions may be used. For example, though the term "server" may appear in the following specification, the disclosed embodiments are not limited to servers. Specific examples of computers that may be used as communication devices include voice over Internet protocol (VOIP) phones, smartphones, personal computers (PCs), tablets, and/or other devices.

Computers may be linked to one another via a network or networks. A network may be any plurality of completely or partially interconnected computers wherein some or all of the computers are able to communicate with one another. It will be understood by those of ordinary skill that connections between computers may be wired in some cases (i.e. via wired TCP connection or other wired connection) or may be wireless (i.e. via WiFi network connection). Any connection through which at least two computers may exchange data can be the basis of a network. Furthermore, separate networks may be able interconnected such that one or more computers within one network may communicate with one or more computers in another network. In such a case, the plurality of separate networks may optionally be considered to be a single network.

Figure 1:
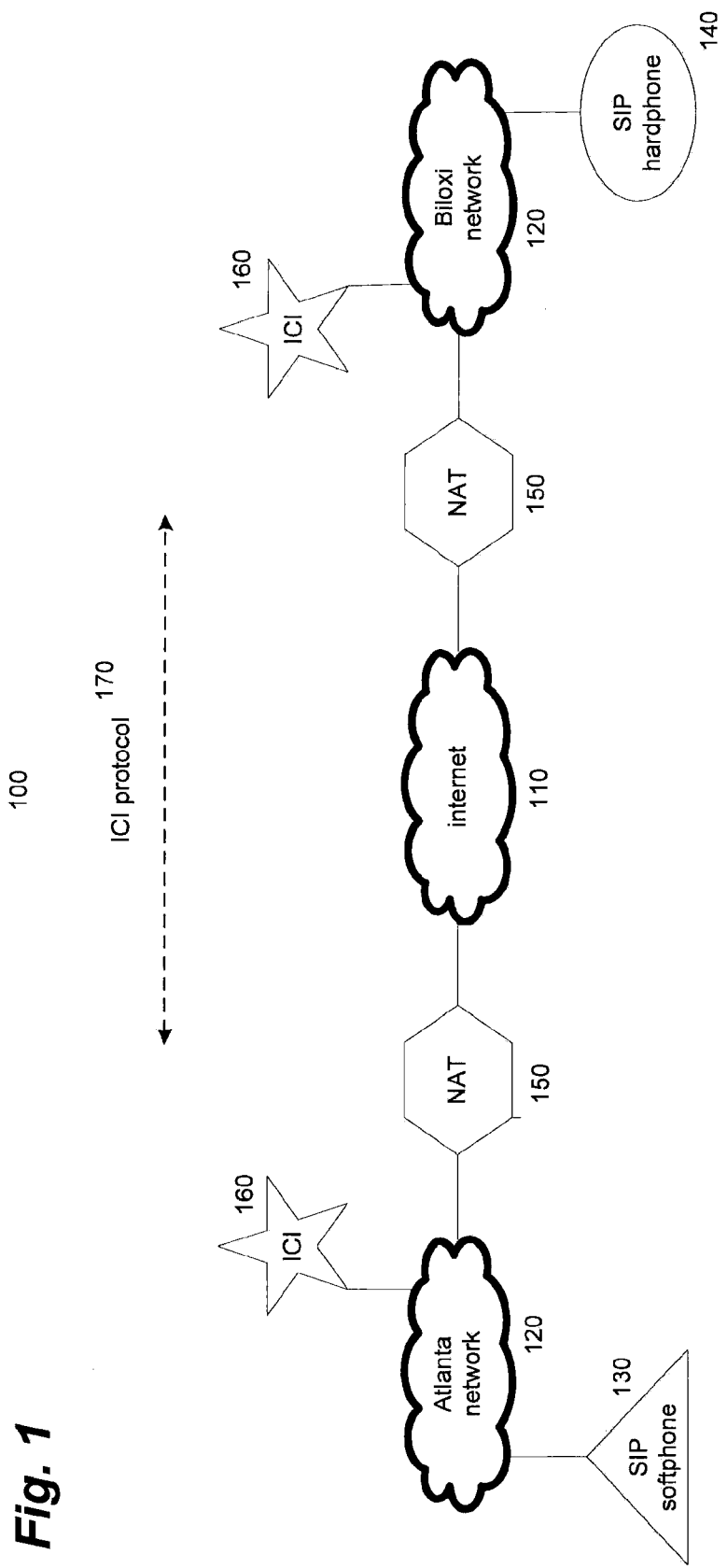
FIG. 1 depicts a network according to an embodiment of the invention.

FIG. 1 depicts a network 100 according to an embodiment of the invention. More specifically, the large-scale network 100 comprises a plurality of interconnected networks, including the Internet 110 and two local networks 120. Individual computers may be connected to the local networks 120. For example, a computer comprising Session Initiation Protocol (SIP) software (a SIP softphone) 130 may be connected to the Atlanta local network 120, and a computer specialized for SIP use (a SIP hardphone) 140, such as a VOIP phone or smartphone, may be connected to the Biloxi local network 120. SIP is a signaling protocol for creating, modifying, and terminating multi-media sessions with one or more peer-to-peer participants. The voice and video stream communications in SIP calls may be transported by a Real-time Transport Protocol (RTP). SIP signaling procedures may include setting up parameters for an RTP media stream such as IP address, port number, protocol, codecs, etc. The parameters may be exchanged and negotiated using a Session Description Protocol (SDP) which may be embedded within SIP signaling information.

In this example, each of the local networks 120 is connected to the Internet 110 through a Network Address Translation (NAT) device 150 or other type of gateway. A NAT device 150 may be deployed at an interface between a public and private network. A NAT device 150 may translate IP addresses and ports between the addresses and ports used by a public network (i.e. the Internet 110) and the addresses and ports used by a private network (i.e. the local networks 120). A NAT device 150 may allow computers on a private network to communicate via the public network while masking the computer's private address to other computers outside the private network. NAT devices 150 may also have various security measures such as firewalls in place to prevent and/or restrict undesirable access to computers inside the private network. In other network embodiments without NAT devices 150, security measures such as firewalls may still be used at interfaces between public and private networks.

When security measures are in place between networks, communications from computers associated with one network must be able to traverse these measures in order to communicate with other computers outside the network. For example, in order for the SIP softphone 130 associated with the Atlanta network 120 to send data to the SIP hardphone 140 associated with the Biloxi network 120, the data must traverse each NAT 150 associated with each of the private networks 120. ICI software and/or hardware 160 may be associated with each of the private networks 120. In the following discussion, "ICI" will be used to indicate any hardware and/or software capable of communicating through an inter-carrier interface. The ICI 160 may enable communication between computers between the private networks 120 using an ICI protocol 170. The systems and methods described herein may enable secure SIP communications over a public or private IP network using PKI (Public Key Infrastructure) security measures.

The ICI 160 may enable data connections between devices that may be on separate networks. These connections may be used to transmit voice, video, audio, and/or any other type of data. Each device may have an associated public address and private address, which may be IP addresses or addresses associated with other protocols. For example, a device associated with a private network 120 may have a private address that may used within the private network 120 and that private address may be masked from outside networks by a NAT 150 or other device. The NAT 150 or other device may use a public address to allow and/or restrict interaction by the device on the private network with computers outside the network. As will be described in greater detail below, the ICI 160, before sending protocol information to a remote SIP device 140 on behalf of a local SIP device 130 during a protocol negotiation session, may securely replace a private IP address of the local SIP device 130 with a public IP address of a local NAT 150. This may allow the remote SIP device 140 to send data to the local NAT 150, using its public IP address. The NAT 150 may then deliver the data to the local SIP device 130. Any individual ICI 160 may be able to act as a client and/or a server when establishing a connection to another ICI 160.

Figure 2:
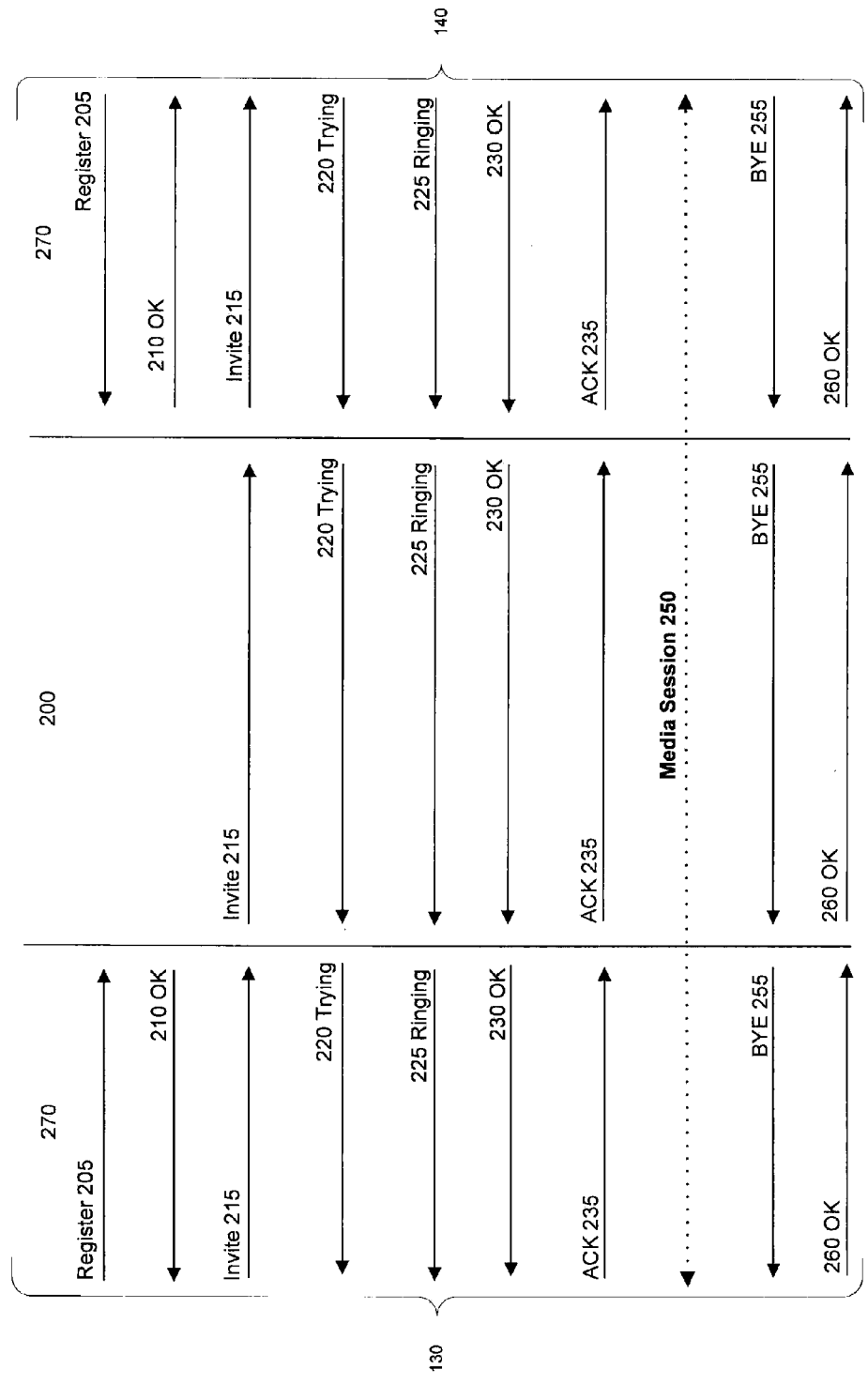
FIG. 2 depicts a set of communication protocol instructions according to an embodiment of the invention.

FIG. 2 depicts a set of communication protocol instructions according to an embodiment of the invention. SIP protocol instructions 270 and ICI protocol instructions 200 that may be compatible with the SIP protocol instructions 270 are shown in this example. A SIP communication session for a pair of SIP devices such as a SIP softphone 130 and SIP hardphone 140 may be performed when both devices 130, 140 carry out the SIP protocol instructions 270. When no ICI 160 is used, a SIP session may proceed as follows. Both devices 130, 140 may register 205 with a network and receive confirmation 210 that they have registered. A source device (here, the SIP softphone 130) may send an invite 215 to a target device (here, the SIP hardphone 140), which may receive the invite 215. In response, the target device 140 may begin trying to establish communication 220 and may ring 225. The target device 140 may inform the source device 130 that it is trying 220 and ringing 225. If connection is successful on the target device 140 end (for example due to a user answering the ringing phone 140), the target device 140 may inform the source device 130 that the attempt was successful 230. The source device 130 may transmit an acknowledgement 235, and a media session 250 may begin. The media session 250 may enable communication of data such as voice, audio, and/or video information between the connected devices 130, 140. When the media session 250 ends (for example due to a user hanging up one of the phones, such as the SIP hardphone 140 in this case), the device ending the session 140 may transmit a message indicating the end of the session 255, and the other device 130 may acknowledge the message 260. In some embodiments, some of the messages described above may be omitted and/or others may be added.

In communication systems and methods employing ICI 160, an ICI protocol 170 may carry some or all of the messages described above between SIP devices. For example, the SIP devices 130, 140 may register 205 with and be acknowledged 210 by ICI systems 160 on their respective networks 120. Then, the remaining communications described above may be handled by an ICI session 200. Communications originating with or intended for the SIP devices 130, 140 may be transmitted and/or received by ICIs 160. As seen in FIG. 2, all of the messages associated with the SIP protocol may be handled by the ICI system 160. In some embodiments, some of the messages described above may be omitted and/or others may be added.

A basic ICI connection process between two devices may proceed as follows. Certificates containing public keys associated with each of the two devices may be exchanged by the devices. For example, a public key infrastructure (PKI) may be used to generate and/or exchange keys. These certificates may be exchanged through any electronic communication medium. Each of the ICIs 160 may import the certificate from the other ICI 160 to a trust store. Each ICI 160 may have its own trust store. Public keys contained in a trust store may be used to establish trust when connections are being made. For example, a first ICI 160 may only connect to a second ICI 160 or accept connections from the second ICI 160 if the first ICI 160 has the second ICI 160's public key in its trust store. Each ICI 160 may obtain a public IP address associated with the other ICI 160, which may be for example a public IP address associated with a NAT device protecting a private network to which an ICI 160 and a communication device are connected. The public IP address may be obtained from an IP lookup website in some embodiments. Public IP addresses may be exchanged through any communication medium, for example via emails between users of the devices or the like. Each ICI 160 may locally register the other ICI 160 by storing data such as device name, public IP address, and/or other data. Each ICI 160 may also register associated communication devices. ICIs 160 that are mutually registered may connect to and communicate with one another through an ICI connection, thereby enabling communication between associated communication devices. For example, a first device may request a connection to a second device. The request may create an open port in a local NAT device associated with the second ICI 160, and the request may be received by the second ICI 160. A communication channel may then be established between the two ICIs 160. Each ICI 160 in a connection may obtain the public key of the other ICI 160 and store it in a local trust store. An ICI connection attempt may be aborted if both parties to a connection do not have each other's keys. Subsets and embodiments of ICI systems and processes are described in greater detail below.

A plurality of communication and display devices that use SIP or some other technology with an ICI 160 may be considered a SIP network. In some embodiments, a SIP network may be associated entirely with a single local network 120. In a SIP network, SIP devices may register with one or more ICIs 160 so that they may send and/or receive SIP VoIP calls or other communications. When the call arrives, for example from a second phone on a second network 120 to a first phone on a first network 120, an ICI 160 associated with the first phone may send the call to the first phone using an IP address that was collected through a registration process, such as the registration process described in greater detail below. ICIs 160 may register SIP phones and create a SIP network of phones behind a NAT/firewall, use SIP outbound proxy service, from behind a NAT/firewall, to validate PKI public keys and to establish mutual inclusive connections with other SIP networks of phones, and/or build distributed, scalable, secure, and privacy protected communication networks.

Each SIP network may manage its associated SIP phones and AORs in a distributed architecture fashion. For example, an ICI 160 for a SIP network may control its own network activities such as adding or deleting AORs, selecting SIP phone models and the call services that the phones can provide, and/or performing other management functions. A SIP network may be added to a larger network of SIP networks without requiring centralized registry or administration. For example, a SIP network in communication with the Internet may be linked to other SIP networks through ICI protocol 170 connections, as will be described in greater detail below. SIP networks may be deployed or removed without interrupting services of the Internet or other SIP networks.

Security may be provided by Public Key Infrastructures (PKI) and NAT/firewall hardware and/or software. A PKI pair of keys, the private key and public key, may be created by an ICI 160. The public key may be self-signed and may be distributed to other ICIs 160 so that connections may be established between ICIs 160. A private key may be kept for local use and may be undistributed. In systems and networks employing self-signed public keys, verification may be performed without the use of a central registry. For example, if both ICIs 160 in a two-way communication attempt have each other's certificates, a connection may be successful, and if one or both ICIs do not have the certificate of the other, the connection may be refused, as will be described in greater detail below. ICIs 160 may exchange their PKI certificates and import the certificates of other ICIs to their own truststores. Truststores may be databases associated with ICIs 160. The truststores may be protected from external access by NAT/firewall hardware or software or other means. The truststores may be encrypred.

Processes for enabling and establishing ICI communications may be considered from the perspective of an individual ICI 160. It will be understood that in order for communication between a plurality of devices to take place, each of the plurality of devices may perform some or all of the following processes and/or additional processes.

Figure 3A:
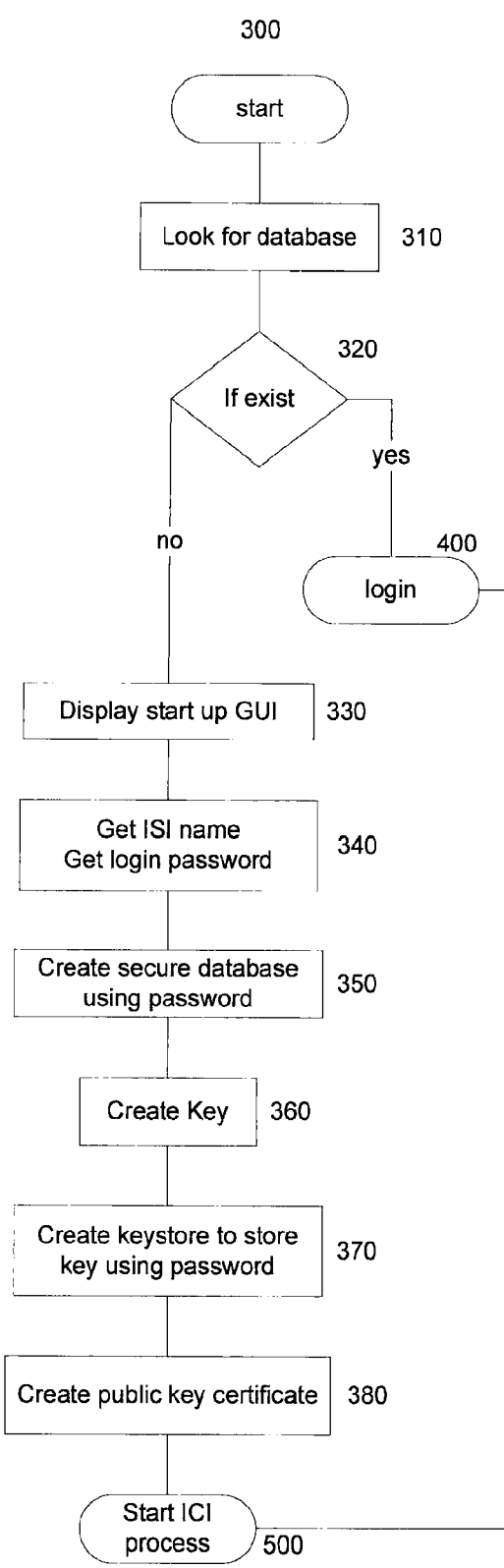
FIG. 3A depicts a communication start up process according to an embodiment of the invention.
Figure 3B:
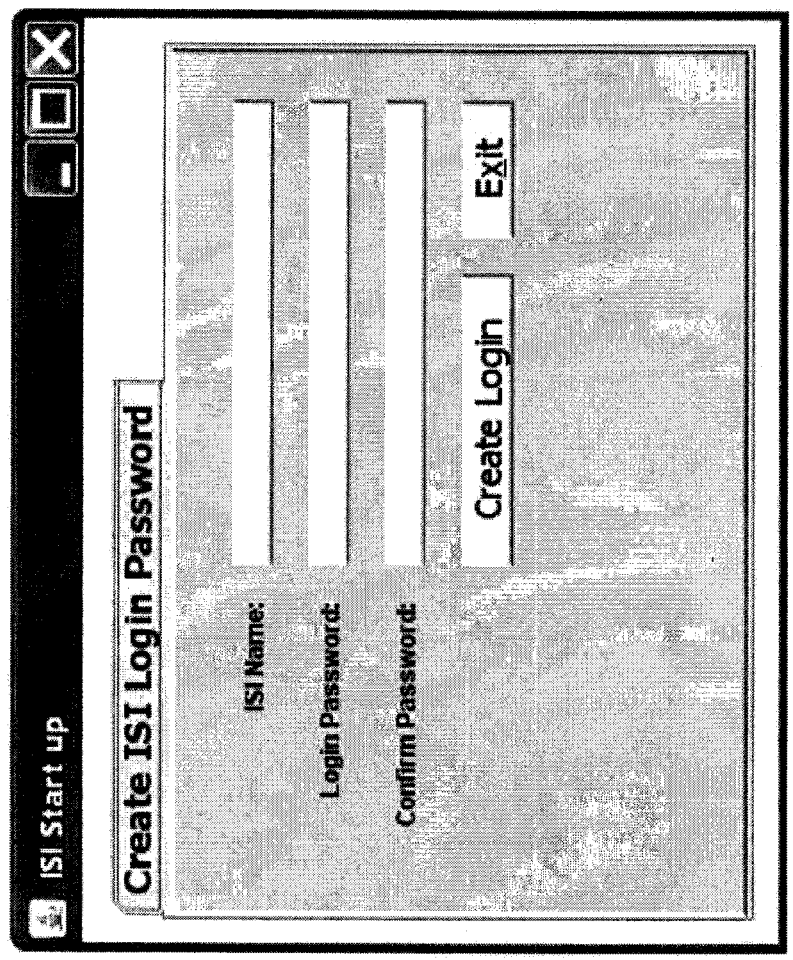
FIG. 3B depicts a start up graphical user interface (GUI) according to an embodiment of the invention.

FIG. 3A depicts a communication start up process 300 according to an embodiment of the invention. When an ICI device (which may be an ICI 160, a communication device 130, 140 on a network associated with an ICI 160, or a combination thereof) attempts to start a communication process, it may look for a previously established database associated with the ICI device 310. The database may contain such data as usernames, passwords, private keys, and/or public key certificates associated with the ICI device. If such a database exists 320, the ICI device may present a login interface, such as a graphical user interface (GUI), to a user 400, described in greater detail with respect to FIGS. 4A-4B below. The user may use this interface to login and start the ICI process 500. If no database exists 320 (or if a user requests to create a new username and/or password in some embodiments), the ICI device may present a startup interface to a user 330. For example, FIG. 3B depicts an example start up GUI 305 according to an embodiment of the invention. As seen in this example GUI 305, a user may be able to enter information such as a username and password. Returning to FIG. 3A, the ICI device may receive an inputted username and password 340 and create a secure database using the password 350. The ICI device may create a private key 360, a keystore to store the private key 370, and a public key certificate 380 which may include a public key. Then the device may start the ICI process 500.

Figure 4A:
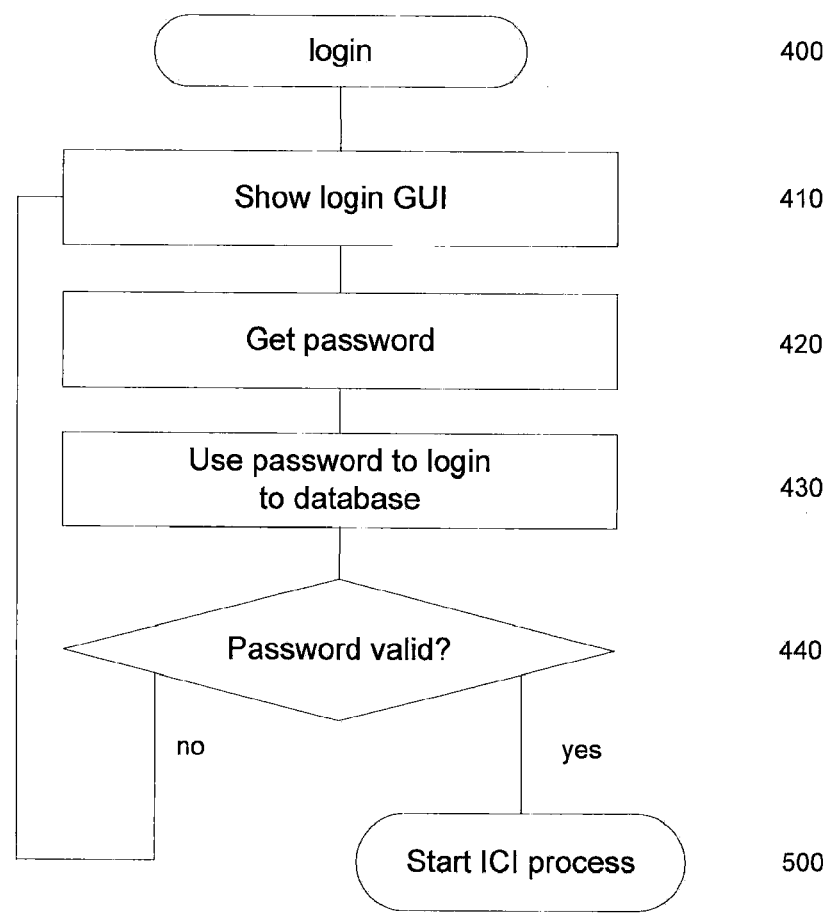
FIG. 4A depicts a login process according to an embodiment of the invention.
Figure 4B:
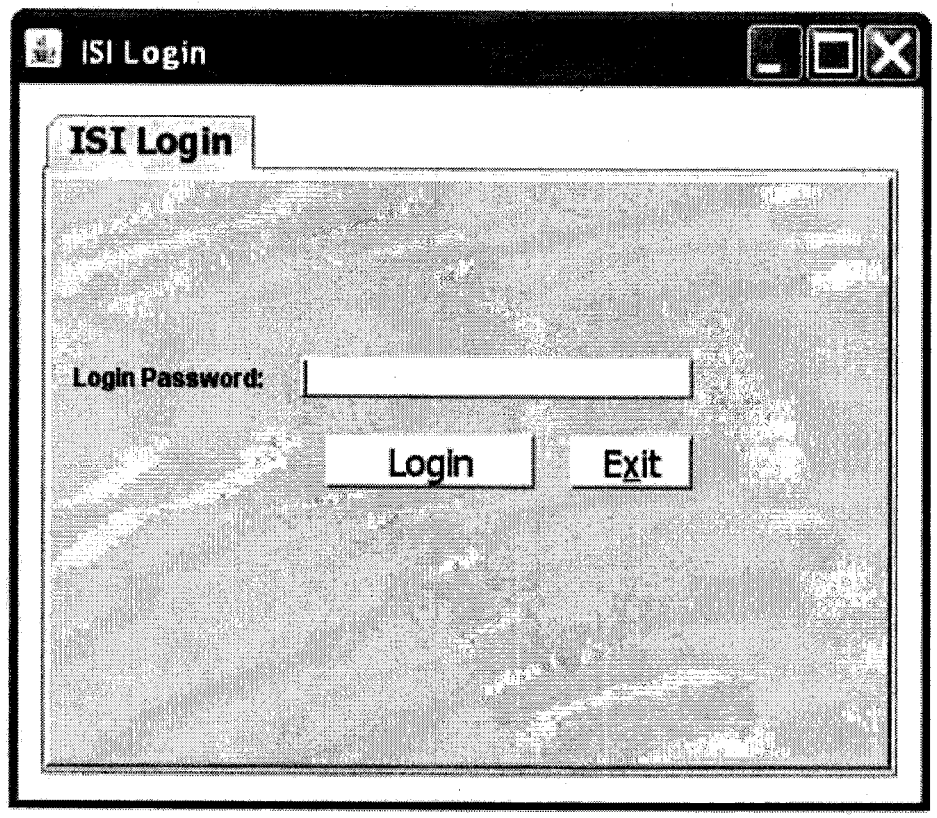
FIG. 4B depicts a login GUI according to an embodiment of the invention.

FIG. 4A depicts a login process 400 according to an embodiment of the invention. Upon initiation of a login process 400, the ICI device may present a login interface, such as a graphical user interface (GUI), to a user 410. For example, FIG. 4B depicts an example login GUI 405 according to an embodiment of the invention. As seen in this example GUI 405, a user may be able to enter a login password associated with the ICI device and/or a username. Returning to FIG. 4A, the ICI device may receive an inputted password 420 and use the password to login to the database 430. A password may be determined to be valid 440 if the password is found in the database and corresponds with the ICI device and/or provided username. If the password is valid 440, an ICI process 500 may begin. If the password is invalid 440, access to the ICI process may be denied and the login GUI may be displayed 410 (or some other message or interface may be displayed).

Figure 5:
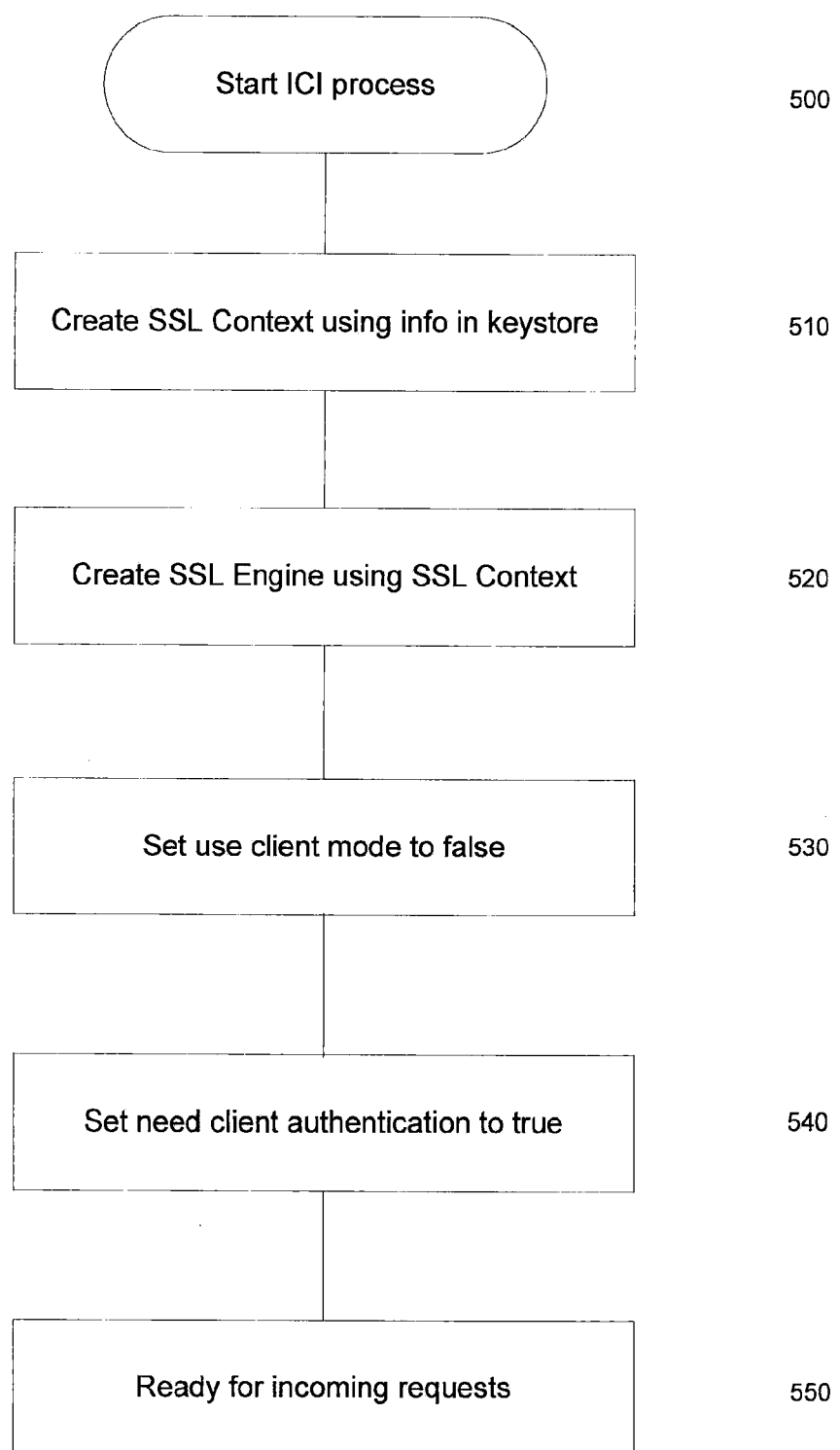
FIG. 5 depicts a server start up process according to an embodiment of the invention.

FIG. 5 depicts a server start up process 500 for the ICI device according to an embodiment of the invention. An ICI device may be both a client and a server when communicating via ICI systems and methods. For example, when the ICI device is sending information it may function as a client, and when the device is receiving information it may function as a server. Therefore, when the ICI process begins 500, the ICI device may establish itself as a server so that it may listen and/or wait for another device to try to connect to it. Using the information in the keystore, the server device may create a secure socket layer context object (SSLContext) 510. The server device may use the SSLContext to create a secure socket layer engine object (SSLEngine) 520. The SSLEngine may enable the server device to transmit and/or receive secure communications. SSLContexts and/or SSLEngines may be created using Java SSL programming and methods or in some other way. Those of ordinary skill in the relevant art will appreciate that in embodiments not using Java, similar functionality to that provided by SSLContext and/or SSLEngine objects may be provided using various hardware and/or software combinations. The SSLEngine of this example may have a setting such as a "use client mode" bit flag that may indicate whether the device is set to use a client mode or a server mode. To function in a server mode, the server device may set this "use client mode" selection to false 530 or otherwise indicate that it will function in server mode. To ensure that other devices attempting to connect to the server device have any necessary security authorization, the server device may set a "need client authentication" setting of the SSLEngine to true 540 or otherwise indicate that client authentication is needed. If client authentication is needed, the server device may verify that any client attempting to connect to the server is registered with the server. This may be done by checking for the attempting client's public key in the server's trust store, for example. After the client authentication setting is made 540, the server device may be ready for incoming connection requests 550.

Figure 6:
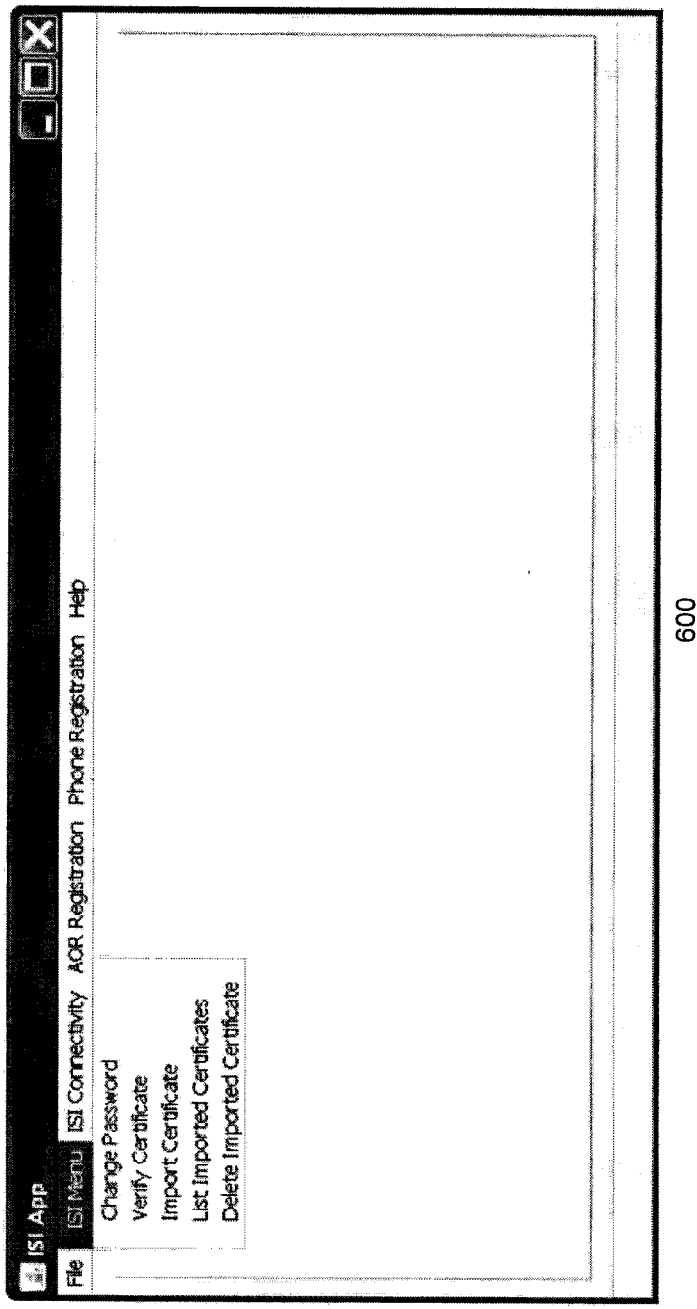
FIG. 6 depicts a GUI according to an embodiment of the invention.

FIG. 6 depicts a GUI 600 according to an embodiment of the invention. This GUI 600 may be presented to a user of an ICI device after login, and in some embodiments after the device is placed in server mode and made ready for incoming connections as described above. This GUI 600 is one example of an interface that may enable a user to interact with the device, but other interfaces, including those that are not GUIs, may be possible. As seen in this example, a GUI 600 may allow a user to change a password, verify a certificate as being trustworthy, import a certificate to the trust store, view certificates in the trust store, delete certificates in the trust store, manage connectivity, register hardware and/or address, and/or perform other tasks. Note that in some embodiments, a password used to login may be different from a password used to access the trust store. A GUI 600 may allow a user to change one or both of these passwords.

Figure 7:
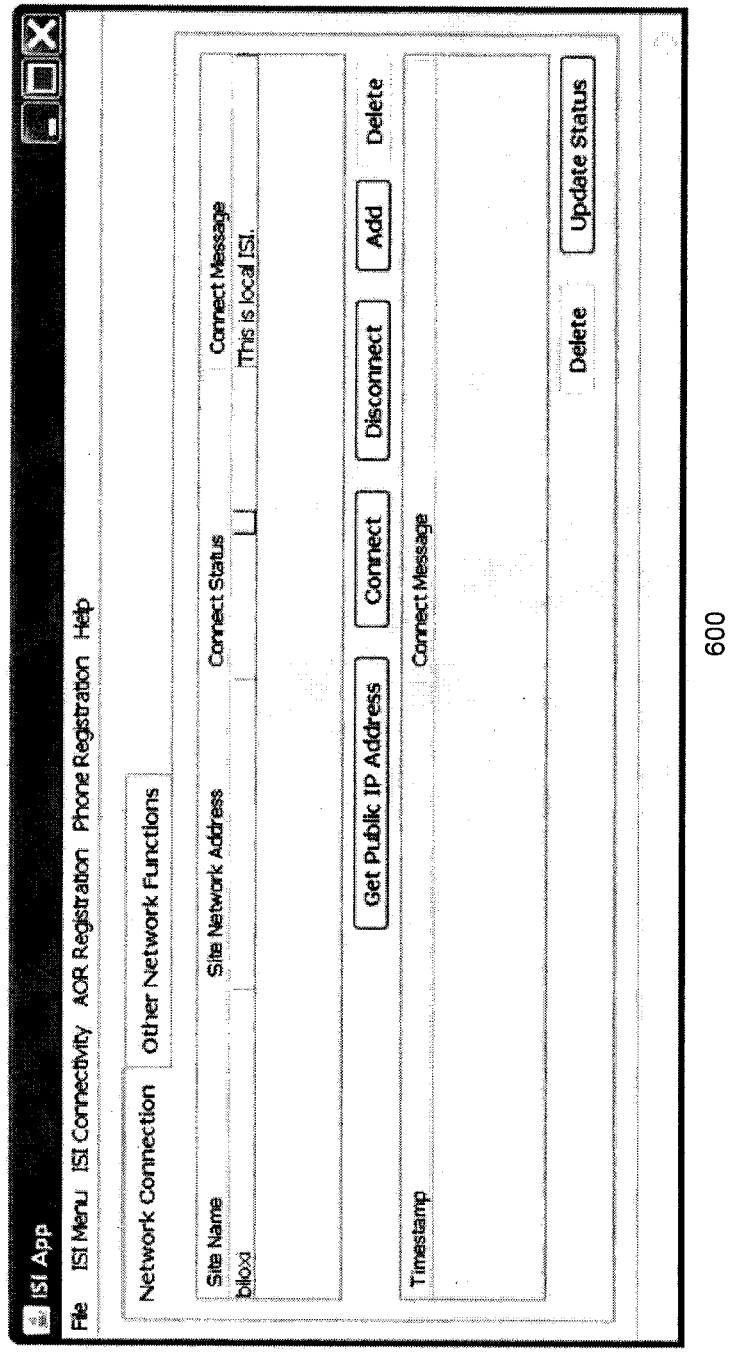
FIG. 7 depicts a GUI according to an embodiment of the invention.

FIG. 7 depicts a GUI 600 according to an embodiment of the invention. As seen in this view, the GUI 600 may enable network connection and other network function management. For example, the GUI 600 may display information about the local network and/or other networks. The GUI 600 may also enable a user to get a public IP address (for example, a public IP address for a local NAT 150 or ICI 160), connect to other devices (for example, remote ICIs 160), disconnect from other devices (for example, remote ICIs 160), add or delete other devices (for example, remote ICIs 160) to its own database, and/or perform other tasks.

Figure 8:
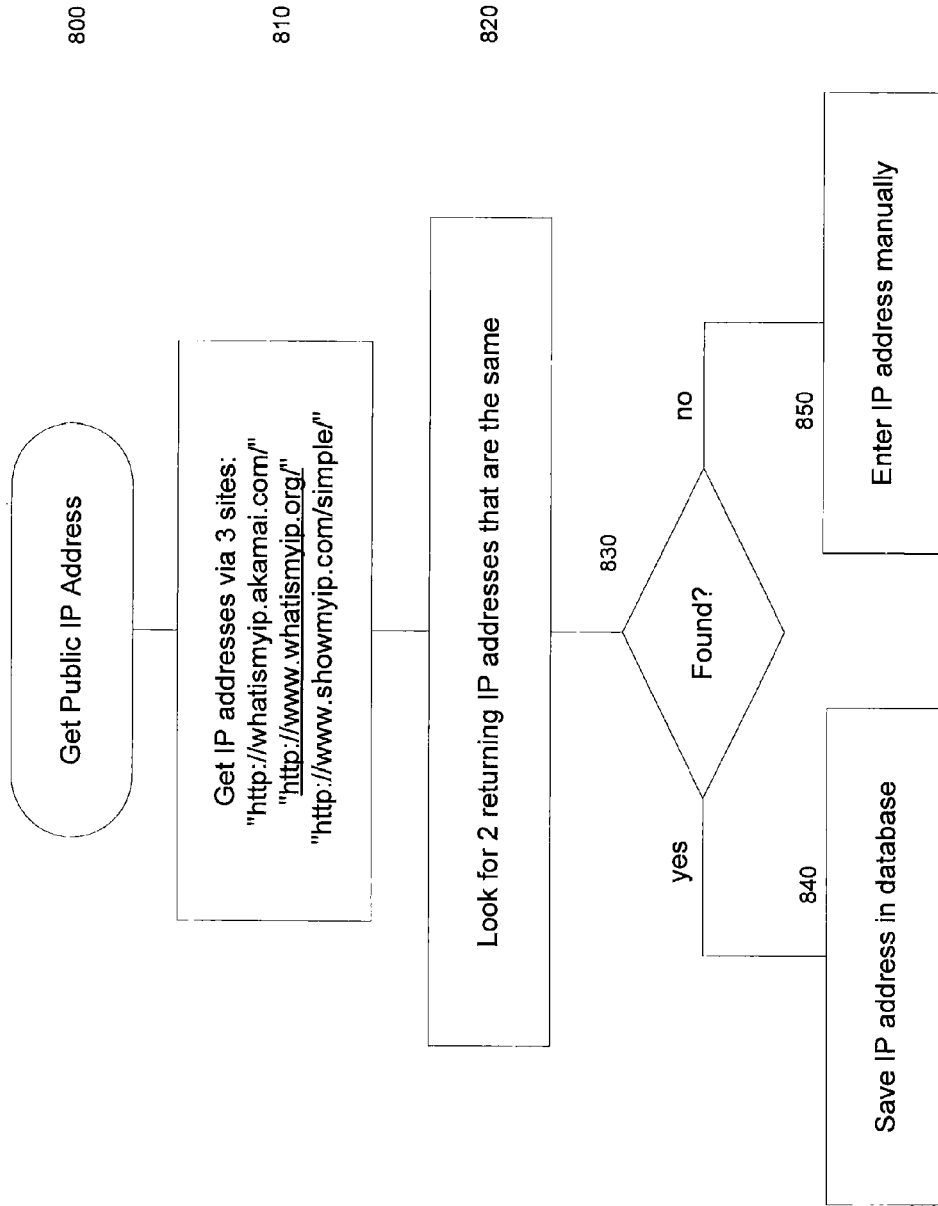
FIG. 8 depicts an address retrieval process according to an embodiment of the invention.

FIG. 8 depicts an address retrieval process 800 according to an embodiment of the invention. For example, a user may click the "Get Public IP Address" button on the GUI 600 of FIG. 7. This may cause the ICI device to attempt to retrieve its own public IP address from a source such as a public server for identifying IP addresses. In other cases, the ICI device may attempt to retrieve its own IP address automatically or due to some other prompt. In some cases, a user may manually enter an IP address. Obtaining a public IP address may allow an ICI device that is on a private network protected by a NAT 150 to use the public IP address for communication with devices on other networks, because the ICI device itself may only have a private network address that may be unsuitable for communications via the Internet or other open network.

As seen in FIG. 8, when the address retrieval process 800 begins, the ICI device may contact a public server via the Internet or some other suitable connection 810. The public server may return the ICI device's IP address to the device. To ensure the IP address is correct, the ICI device may contact a plurality of public servers 810 and compare the returned addresses 820. If the ICI device receives a plurality of identical IP addresses 830, it may save the IP address 840 that is the identical address. If the ICI device does not receive any matching IP addresses 830 (because all returned addresses are different or it does not receive a plurality of returned addresses), the ICI device may not enter an IP address automatically. A user may manually enter an IP address 850, and in some cases the user may later manually enter an IP address even if a matching plurality of addresses is received. When an IP address is determined, the IP address may be automatically associated with the ICI device in some embodiments, or a user may click an "Update Status" button as shown in the GUI 600 to associate the IP address with the ICI device. The public IP address may be used by the ICI device to enable device communications with outside devices. For communications between the ICI device and other devices in the same private network (for example SIP phones or a second ICI device on the same local network 120), the private address may be used.

As noted above, a first ICI device and/or user may share this device IP address with a second ICI device and/or a user of a second device. The second ICI device may store information about the first ICI device, which may include the public IP address, and thereby register the first ICI device with itself. Note that when the ICI device is on a private network with private IP addresses, such as a network protected by a NAT 150, the public IP address determined by this process may be an address for the NAT 150. When the ICI device is not protected by a NAT 150 or similar security measure, the public IP address may be an actual IP address for the ICI device itself.

Figure 9:
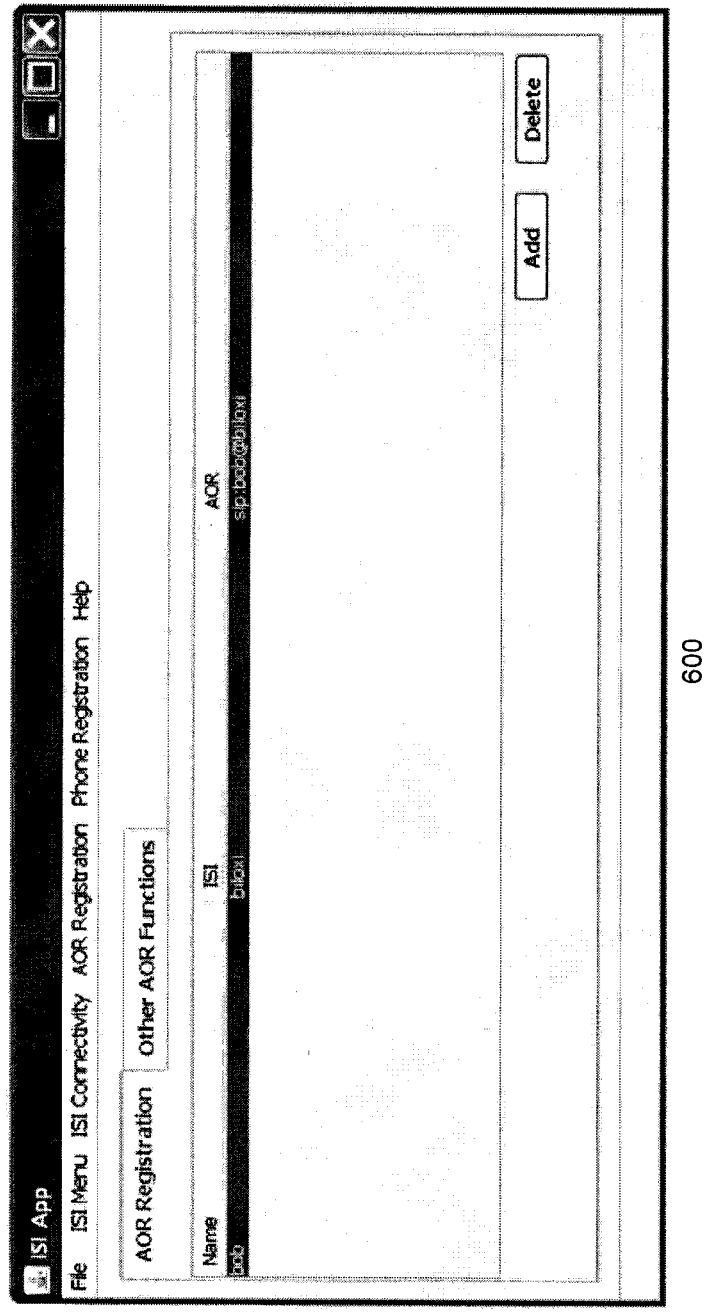
FIG. 9 depicts a GUI according to an embodiment of the invention.

FIG. 9 depicts a GUI 600 according to an embodiment of the invention. In this example GUI 600, an address of record (AOR) registration interface is shown. An AOR may be a unique identifier for a device and/or a user. An AOR may be used by an ICI device to identify a target for connection. In an ICI device's memory, an AOR for another ICI device may be linked to other data about its associated device, such as the IP address and/or other connection information for the device. Like the IP address, a first ICI device and/or user may share an AOR with a second device and/or user. In this example, a name (for example a device name or user name) and a local network name are used to generate an AOR. For example, the user name "bob" and local network "Biloxi" are used to form the AOR "sip:bob@biloxi". In this example, the AOR is a combination of a user name, an "@" symbol, and an ICI 160 name. The ICI 160 name may be established when the ICI 160 is installed on a network. For example, the ICI 160 name may be a name of the network or may be chosen by an administrator or in some other way (i.e. a user Robert Smith may create an AOR and ICI 160 name for a home network such as Robert@theSmiths). In some embodiments, an ICI Uniform Resource Identifier (URI) may be formed by prefixing the AOR. For example, the AOR may be prefixed with "sip:" (e.g., sip:Robert@the Smiths). If another user wishes to contact Robert Smith, they may enter Robert Smith's URI into their GUI 600 to initiate a connection. In some embodiments the AORs (and therefore the URIs) may be created locally by a user or administrator as opposed to centrally by a central registration system. In some embodiments, the local network may appear in the AOR for all devices associated with that network. In other examples and embodiments, AORs may have other formats.

Figure 10:
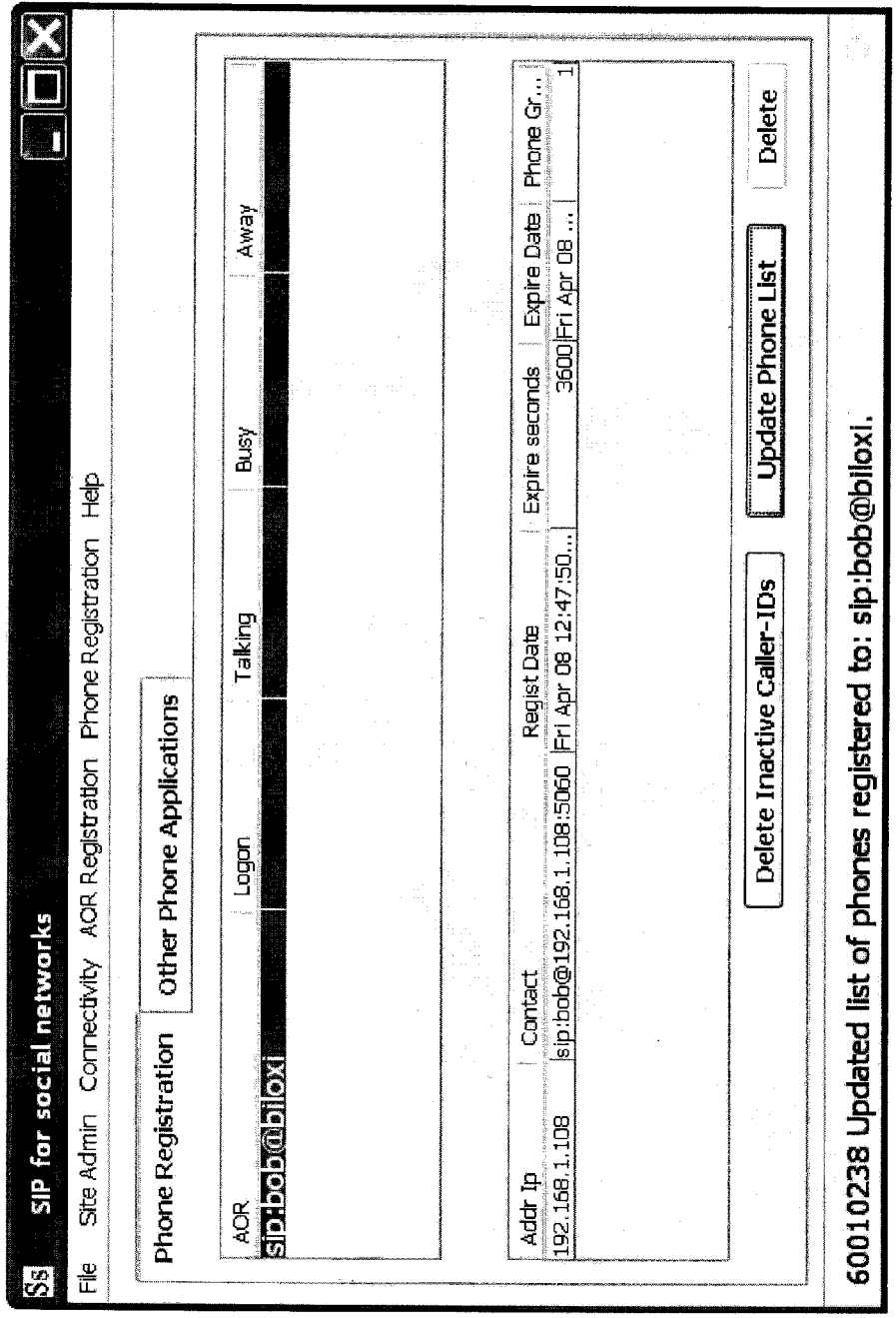
FIG. 10 depicts a GUI according to an embodiment of the invention.

FIG. 10 depicts a GUI 600 according to an embodiment of the invention. In this example GUI 600, a phone registration interface is shown. One or more phones (or other devices) may be associated with one or more AORs. For example, a device having a local IP address 127.0.0.1 is associated with AOR sip:bob@biloxi. As seen in this example, registration dates, expiration dates (indicating when registration will lapse), and/or device groups may be associated with registered devices. The AOR and/or other identifying data may contain information about the ICI device and the associated SIP device to which communications are to be directed, so that specific SIP devices may be reached when an ICI device is associated with a plurality of SIP devices.

Figure 11:
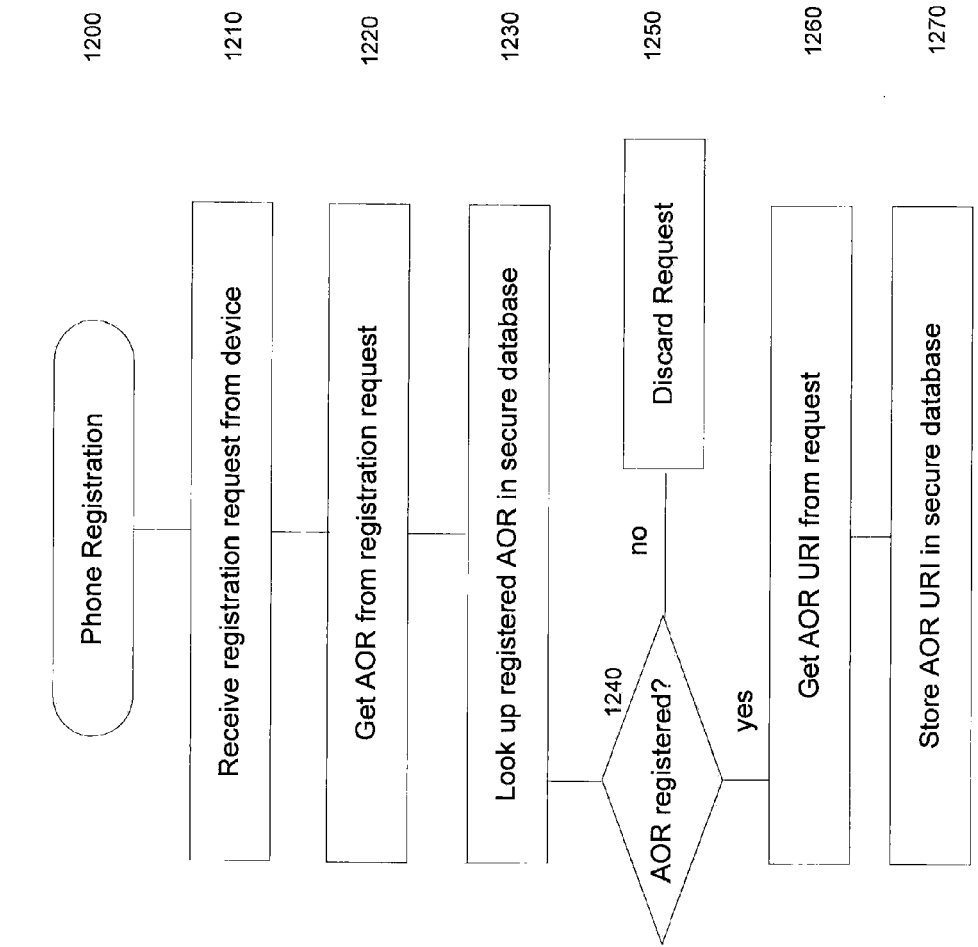
FIG. 11 depicts a registration process according to an embodiment of the invention.

FIG. 11 depicts a device registration process 1200 according to an embodiment of the invention. This process 1200 may verify the authenticity of an AOR and register devices associated with the AOR to enable secure communications between them and other devices associated with other registered AORs. For example, this process 1200 may be used to register a SIP phone on one network with an ICI device on the same network, so that the SIP phone may use the ICI device for external communications. A first device may transmit a device registration request to a second device or local ICI 160 associated with the second device with which it wishes to be registered 1210. The second device may extract an AOR from the registration request 1220. The second device may search its secure database to determine whether the AOR is stored in the secure database (which may be, for example, an AOR registration database) 1230. The AOR may be in the secure database if, for example, it was previously entered into the database by a user of the second device or the ICI 160 associated with the second device. In some embodiments, AORs may be exchanged between devices over separate secure channels or otherwise received and stored by devices (e.g., via email between users or the like). If the AOR is not registered 1240, the request to register the device associated with the AOR may be discarded 1250 and/or an error message may be delivered to the device. If the AOR is registered 1240, the ICI 160 may get a uniform resource identifier (URI) or other device identifier, IP address, and/or other AOR contact information from the request 1260 and may store the URI in the secure database and/or link the URI to the associated AOR in the secure database 1270. In the event of an incoming call, an ICI 160 may look up the IP address of the device to which the call is directed in its database using the AOR or other unique identifier and then may use the IP address to send the call to the local device to which the call has been placed.

Figure 12:
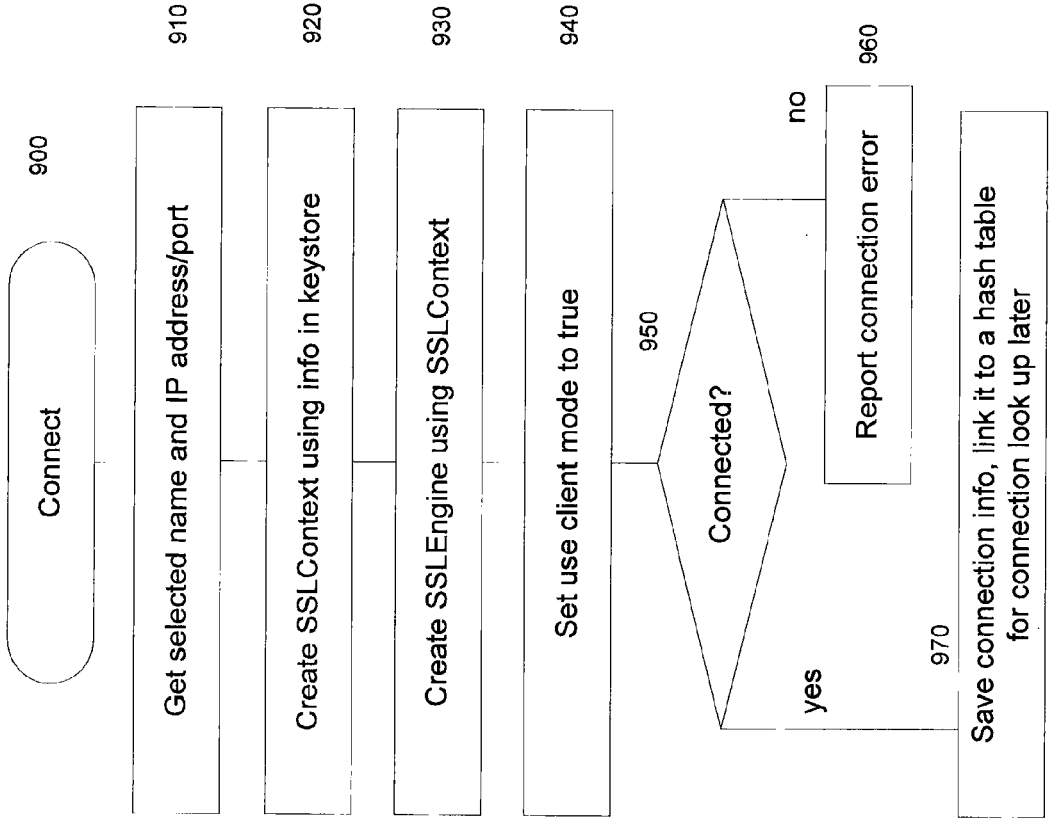
FIG. 12 depicts a connection process according to an embodiment of the invention.

FIG. 12 depicts a connection process 900 according to an embodiment of the invention. When a first device has information about a second device, the first device may attempt to connect to the second device. For example, the first device may get information about the second device 910. This may be done through an exchange of data with the second device through some other channel, by retrieving the information from memory or an outside data source, and/or by an exchange between the device users. The information may include a name of the second ICI device and/or connection information useful to connect to the second device, such as the second device's IP address, port, public key, a device name associated with the ICI device, and/or other data. The first ICI device may create an SSLContext 920 and create an SSLEngine using the SSLContext 930. Unlike the example of FIG. 5 above, the first ICI device may set a "use client mode" flag (or other setting enabling client mode) to true 940, because an ICI device functioning as a client may be able to transmit data to another device. Once in client mode, the first ICI device may attempt to connect to the second ICI device 950. Aspects of an example connection attempt (and communication process once connected) are described in further detail with respect to FIGS. 34-35 below. If the attempt is unsuccessful, the first ICI device may report a connection error 960 and/or restart the connection process. If the attempt is successful, the first ICI device may save information about the connection and store it in a hash table so that it can be reused for future communications with the same second ICI device 970. For example, this saved information may comprise proper dynamic host table routing and/or other information.

Figure 34:
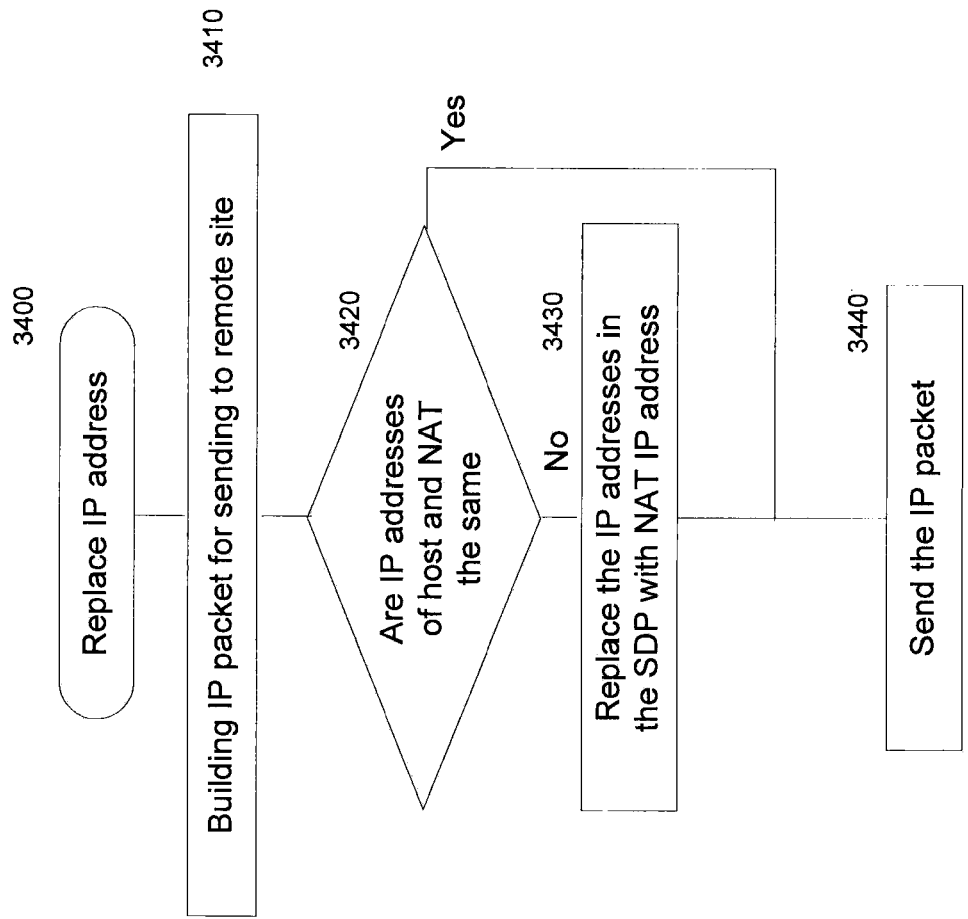
FIG. 34 depicts a communication process according to an embodiment of the invention.

FIG. 34 depicts a communication process 3400 according to an embodiment of the invention. This process 3400 may be used by a first ICI device attempting to connect and/or communicate with a second device using an ICI protocol 170. The process 3400 may enable connecting devices to negotiate optimal parameters for connection in the SDP. This process 3400 may comprise swapping a public and private IP address for a device, which may enable ICI protocol 170 communications between that ICI device and other ICI devices such that the communications may be capable of traversing a NAT 150 or other security measure.

A first ICI device may build an IP packet 3410 for sending to a second ICI device associated with another local network. The first ICI device may check whether its IP address and the public IP address for the first ICI device's NAT 150 (determined, for example, by the first ICI device according to the process 800 of FIG. 8 and stored in the first device's secure database) are the same 3420. If they are not, for example when the first ICI device is on a private network, the first ICI device may replace the IP address in the packet with the stored NAT 150 IP address 3430. If the first ICI device is behind a NAT 150, the private IP address of the first ICI device can't be used by the remote SIP phone device. In that case, the first ICI device may replace its private IP address in the SDP with the public IP address of the NAT 150. This public IP address may allow the remote SIP phone device to communicate with the SIP phone device in the private address space by means of the NAT 150, via the first and second ICI devices. Then the first device may send the IP packet 3440. If the IP address for the first ICI device and the public IP address (determined, for example, by the first ICI device according to the process 800 of FIG. 8 and stored in the first device's secure database) are the same, the swapping process of the first device may default to using the existing IP address in the packet and send the negotiation exchanges from the first SIP device to a remote ICI device for communication directly to the second SIP device 3440.

Figure 35:
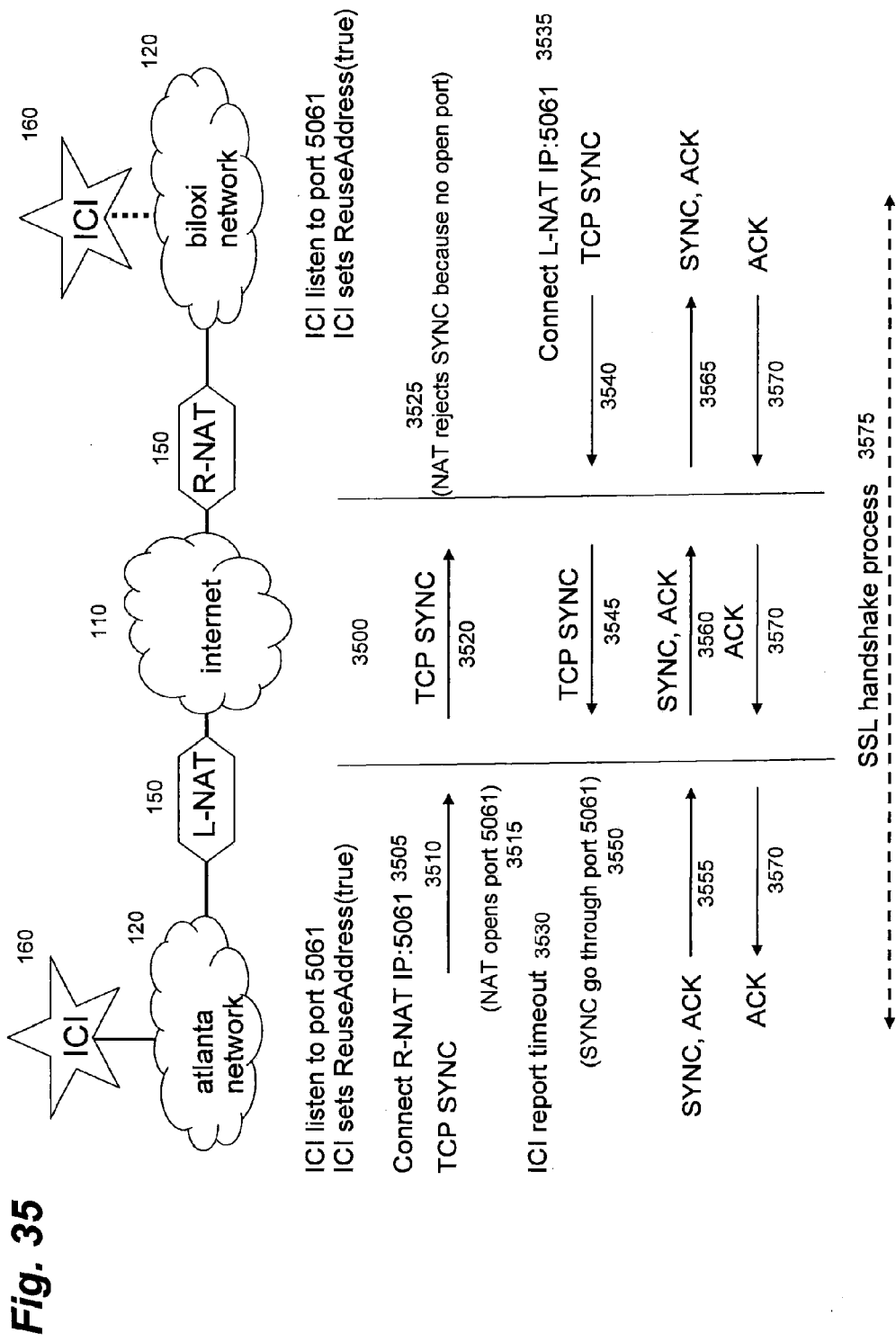
FIG. 35 depicts a connection process according to an embodiment of the invention.

FIG. 35 depicts a connection process 3500 according to an embodiment of the invention. In this example process 3500, communication between a SIP device (not shown) on the Atlanta network 120 and a SIP device (not shown) on the Biloxi network 120 is being initiated by the ICI 160 associated with the Atlanta network 120. In this example, the ICIs 160 of both networks 120 are configured to listen to port 5061 of their associated NATs 150 (in server mode, as described above), but it will be understood that other ports may be used.

The process 3500 may be initiated when an SIP device on the Atlanta network 120 may attempt to call a SIP device on the Biloxi network 120. The process 3500 may also be initiated to open a channel between the Atlanta and Biloxi networks 120 that may be used for future calls between SIP devices. The Atlanta ICI 160 may attempt to connect 3505 to the Biloxi NAT 150 through port 5061 of the Biloxi NAT 150 (in client mode, as described above). The Atlanta ICI 160 may generate a TCP sync message 3510 and the Atlanta NAT 150 may open port 5061 (the NAT 150 may be directed to open this port by the ICI 160) 3515. The TCP sync message may be transmitted via ICI protocol 3520 and received by the Biloxi NAT 150. The Biloxi NAT 150 may reject the sync command because it has no open port 3525. The Atlanta ICI 160 may report a timeout 3530 because the sync command was rejected by the Biloxi NAT 150. The Biloxi ICI 160, which is listening to the Biloxi NAT 150 port 5061 (in server mode, as described above), may detect the traffic from the Atlanta ICI 160 and attempt to connect 3535 to the Atlanta NAT 150 through port 5061 of the Atlanta NAT 150 (in client mode, as described above). In some embodiments, the connection process of the Biloxi ICI 160 may be manually initiated by a user clicking a connect button instead of via an automated process. The Biloxi ICI 160 may generate a TCP sync message 3540. The TCP sync message may be transmitted via ICI protocol 3545 and received by the Atlanta NAT 150. The sync message from the Biloxi ICI 160 may go through the Atlanta NAT 150 at port 5061 because the port has been opened 3550. The Atlanta ICI 160 may receive the sync message and transmit a sync and acknowledgement 3555 via ICI protocol 3560 to the Biloxi ICI 160, which may receive the data 3565. The Biloxi ICI 160 may send an acknowledgement 3570 to the Atlanta ICI, and communications between the ICIs 160 may now be open via port 5061 on the Atlanta NAT 150 and the Biloxi NAT 150.

With an ICI protocol channel open and the NAT 150 security traversed, the Atlanta ICI 160 and the Biloxi ICI 160 may perform an SSL handshake 3575 and communicate with one another. For example, SSLContexts and/or SSLEngines such as those described in the context of FIG. 5 above may be used by the ICIs 160. The communications between ICI 160 devices may use private network addresses to direct the communications to the appropriate SIP devices within the local networks 120 once the channel has been opened. An incoming request to open a connection from a remote ICI 160 may cause a local ICI 160 to perform certification validation and SSL handshake procedures. If an SSL handshake is successful, the SSLEngines of the ICIs 160 may negotiate a secret key. The secret key may be used by each ICI 160 to encrypt information provided by a SIP device before the ICI 160 sends the information to the remote ICI 160. Note that both ICIs 160 are in server mode when listening for and/or receiving data and are in client mode when sending data throughout the entire process 3500 of FIG. 35.

Figure 13:
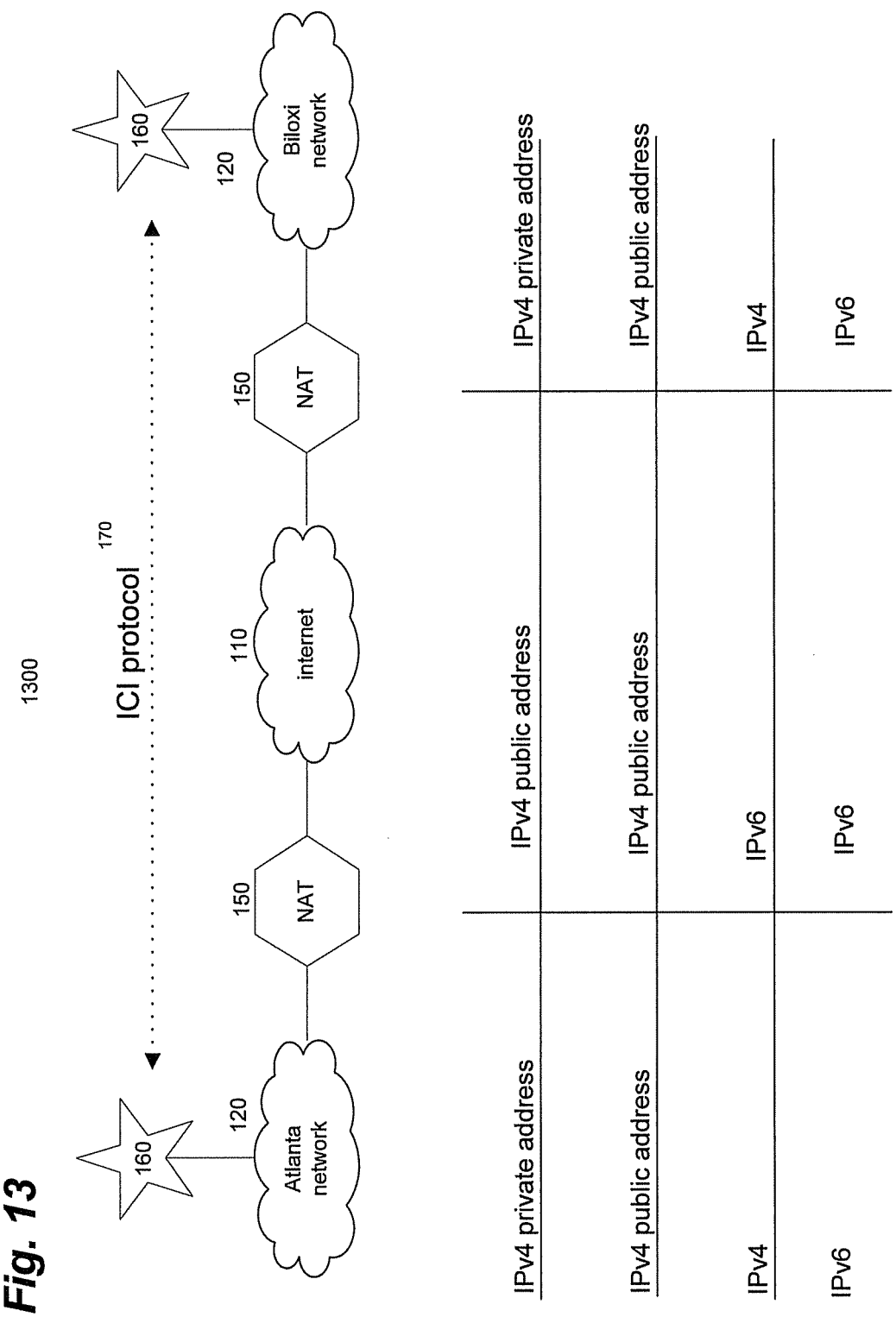
FIG. 13 depicts a network according to an embodiment of the invention.

FIGS. 13-32 depict various networks to illustrate example network and/or device configurations. Those of ordinary skill in the relevant art will appreciate that these examples are not exhaustive. FIG. 13 depicts a network 1300 according to an embodiment of the invention. This network 1300 has an overall configuration similar to that of the network 100 in FIG. 1. In the network 1300, SIP devices may use a variety of different protocol versions. For example, devices associated with either the Atlanta or Biloxi networks 120 may have IPv4 private addresses within the network 120 while the NATs 150 use IPv4 public addresses to communicate with other computers via the Internet 110. Devices associated with either the Atlanta or Biloxi networks 120 may have IPv4 public addresses within the network 120 while the NATs 150 use IPv4 public addresses to communicate with other computers via the Internet 110. Devices associated with either the Atlanta or Biloxi networks 120 may have IPv4 addresses (private or public) within the network 120 while the NATs 150 use IPv6 addresses to communicate with other computers via the Internet 110. Devices associated with either the Atlanta or Biloxi networks 120 may have IPv6 addresses within the network 120 while the NATs 150 use IPv6 addresses to communicate with other computers via the Internet 110. Other protocols and protocol combinations may be used in various embodiments.

Figure 14:
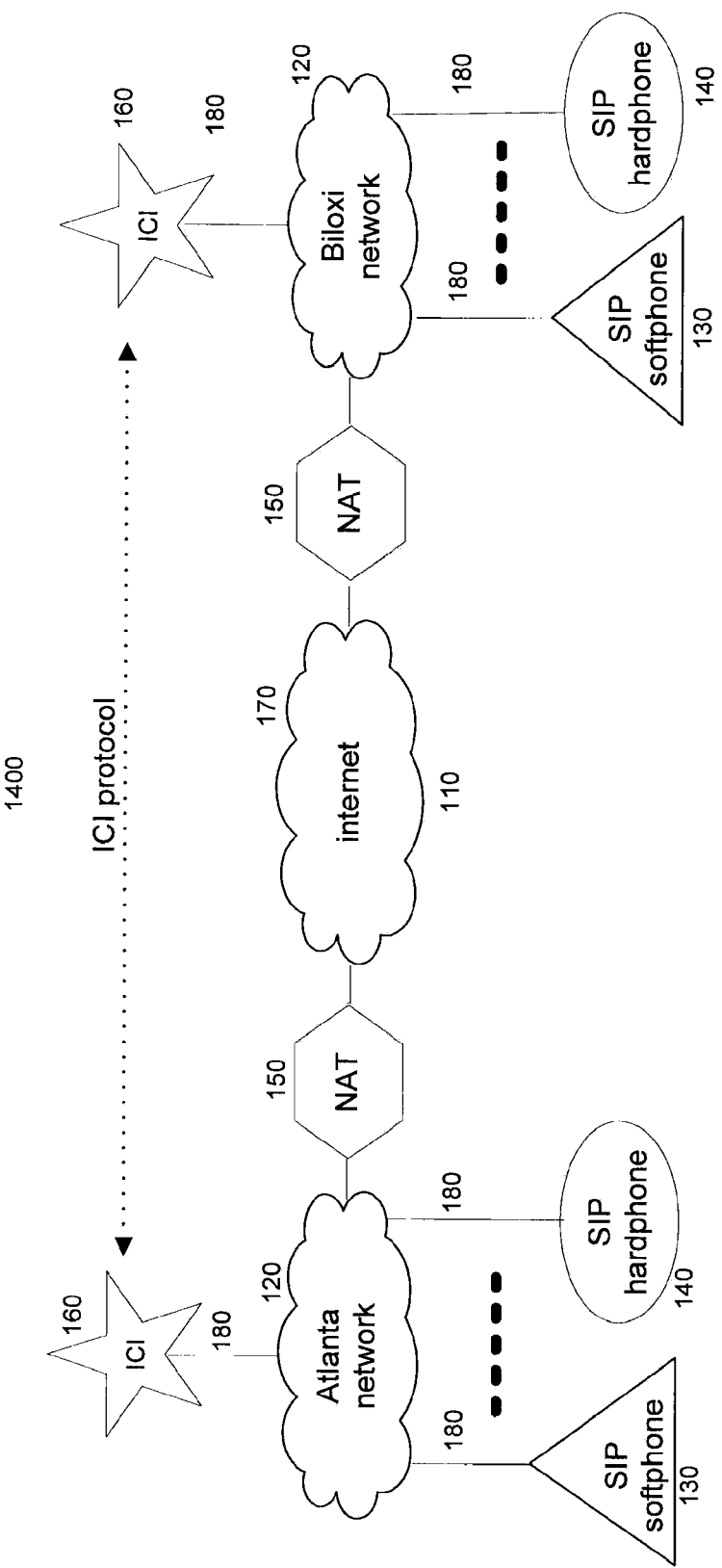
FIG. 14 depicts a network according to an embodiment of the invention.

FIG. 14 depicts a network 1400 according to an embodiment of the invention. This network 1400 has an overall configuration similar to that of the network 100 in FIG. 1, but wherein each local network 120 has a plurality of associated communication devices such as SIP softphones 130 and SIP hardphones 140. Also, in this embodiment all connections between various devices (SIP softphones 130, SIP hardphones 140, and ICI 160) and the local networks 120 are wired connections 180.

Figure 15:
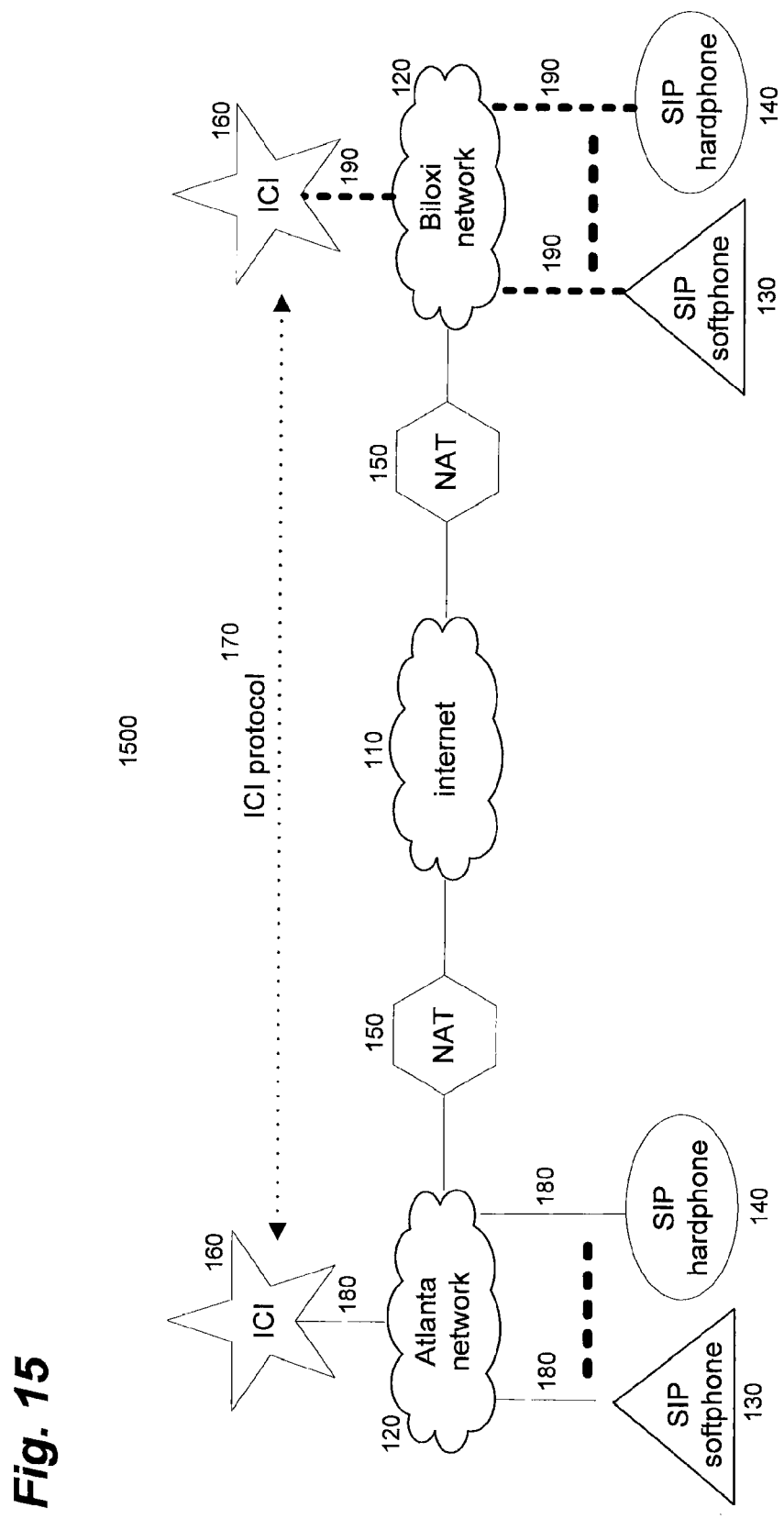
FIG. 15 depicts a network according to an embodiment of the invention.

FIG. 15 depicts a network 1500 according to an embodiment of the invention. This network 1500 has an overall configuration similar to that of the network 1400 in FIG. 14, but in this embodiment connections between various devices (SIP softphones 130, SIP hardphones 140, and ICI 160) and the local networks 120 may be either wired connections 180 or wireless connections 190. For example, all devices (SIP softphones 130, SIP hardphones 140, and ICI 160) associated with the Atlanta network 120 have wired connections 180, and all devices (SIP softphones 130, SIP hardphones 140, and ICI 160) associated with the Biloxi network 120 have wireless connections 190.

Figure 16:
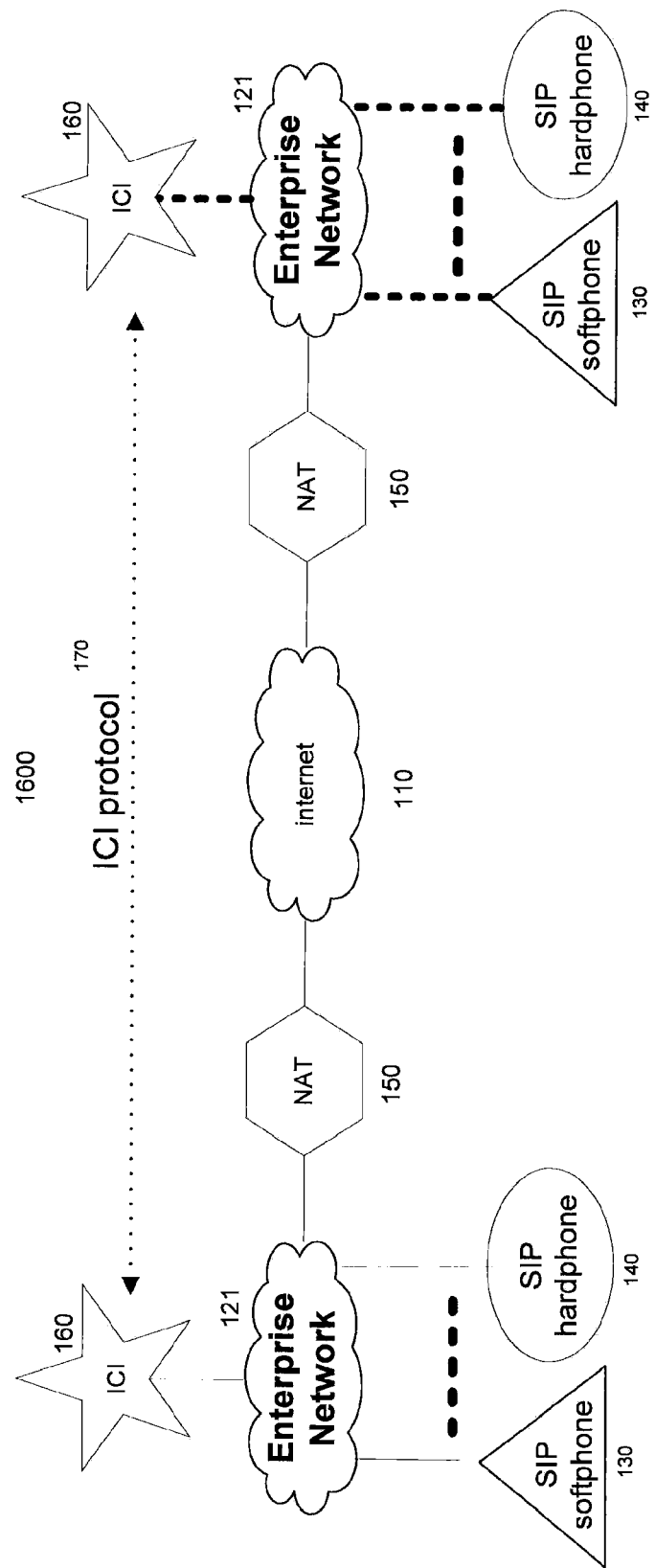
FIG. 16 depicts a network according to an embodiment of the invention.

FIG. 16 depicts a network 1600 according to an embodiment of the invention. This network 1600 has an overall configuration similar to that of the network 1500 in FIG. 15, but in this embodiment the local networks are enterprise networks 121 such as university or corporate networks, for example. The separate enterprise networks 121 may be unrelated enterprise networks 121 (for inter-domain communications) or may be separate portions of the same enterprise network 121 (for intra-domain communications).

Figure 17:
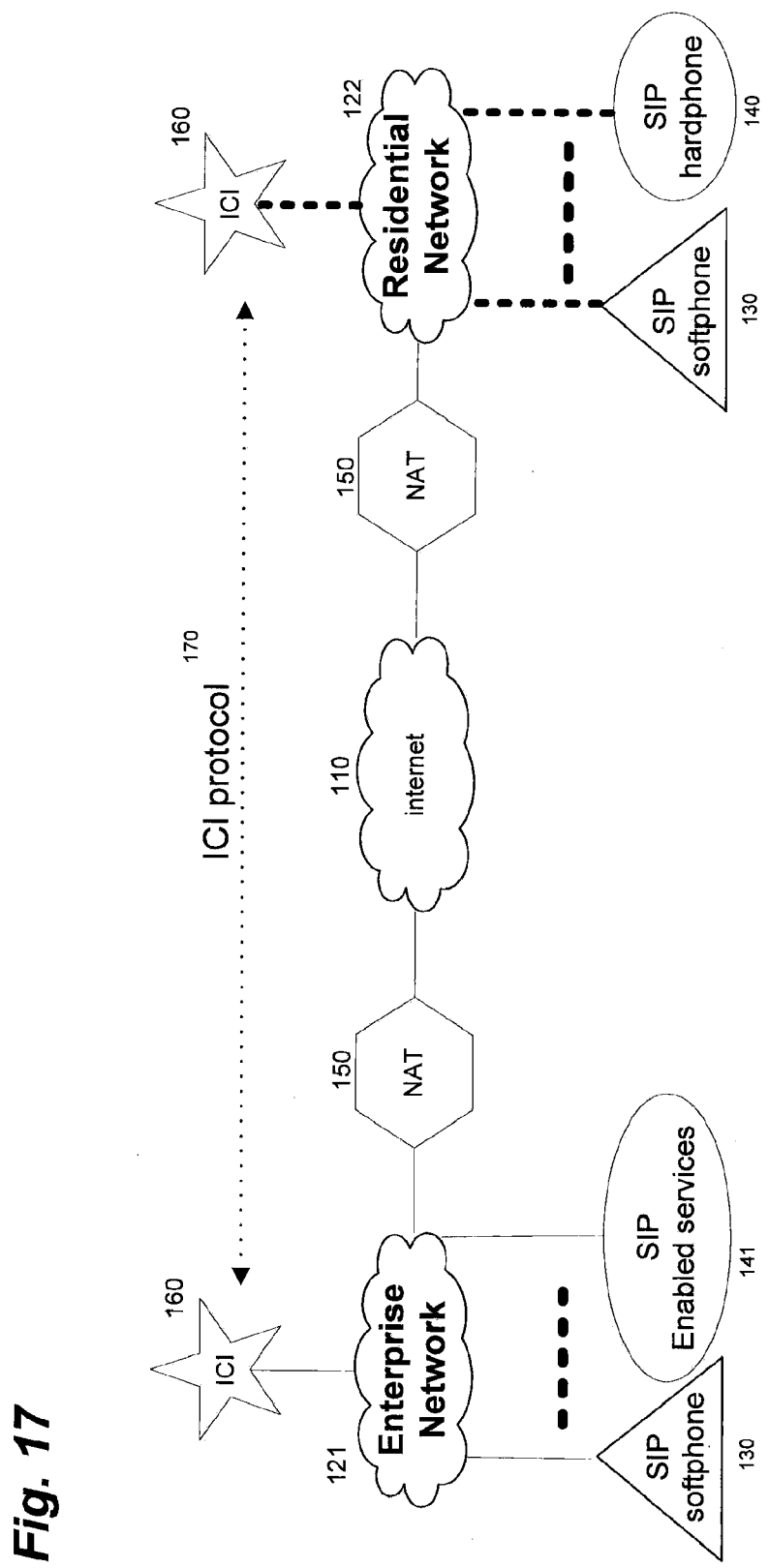
FIG. 17 depicts a network according to an embodiment of the invention.

FIG. 17 depicts a network 1700 according to an embodiment of the invention. This network 1700 has an overall configuration similar to that of the network 1500 in FIG. 15, but in this embodiment one of the local networks is an enterprise network 121 and one of the local networks is a residential network 122 such as a network provided by a home wireless router, for example. This situation may arise when a user of a residential network 122 is working or studying from home and wishes to access their corporate or university network, for example.

Figure 18:
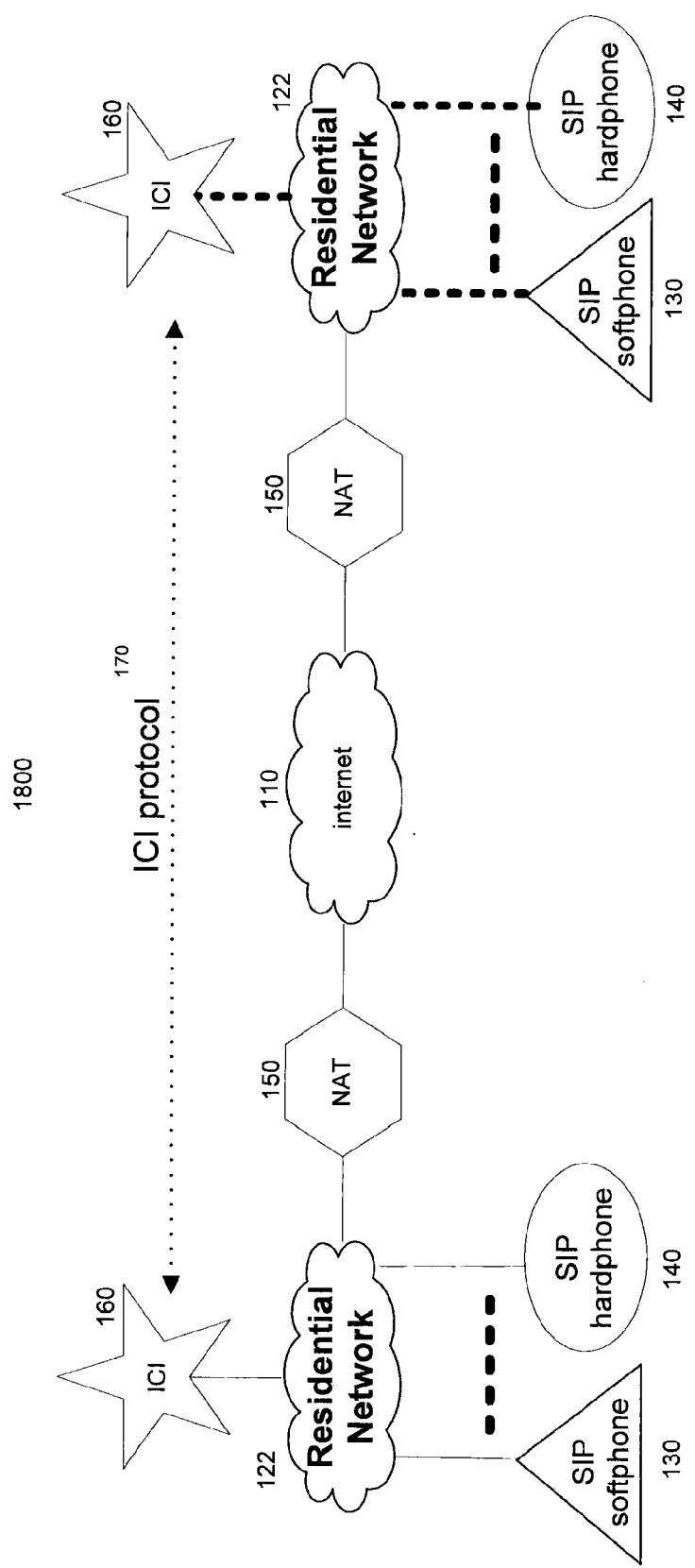
FIG. 18 depicts a network according to an embodiment of the invention.

FIG. 18 depicts a network 1800 according to an embodiment of the invention. This network 1800 has an overall configuration similar to that of the network 1500 in FIG. 15, but in this embodiment the local networks are residential networks 122. This situation may arise when users of devices associated with separate residential networks 122 wish to communicate with one another using social media, chat, or voice software, for example. In some embodiments, this scenario may correspond to users of separate devices associated with a social network at least partly based on communications made via an ICI protocol 170.

Figure 19:
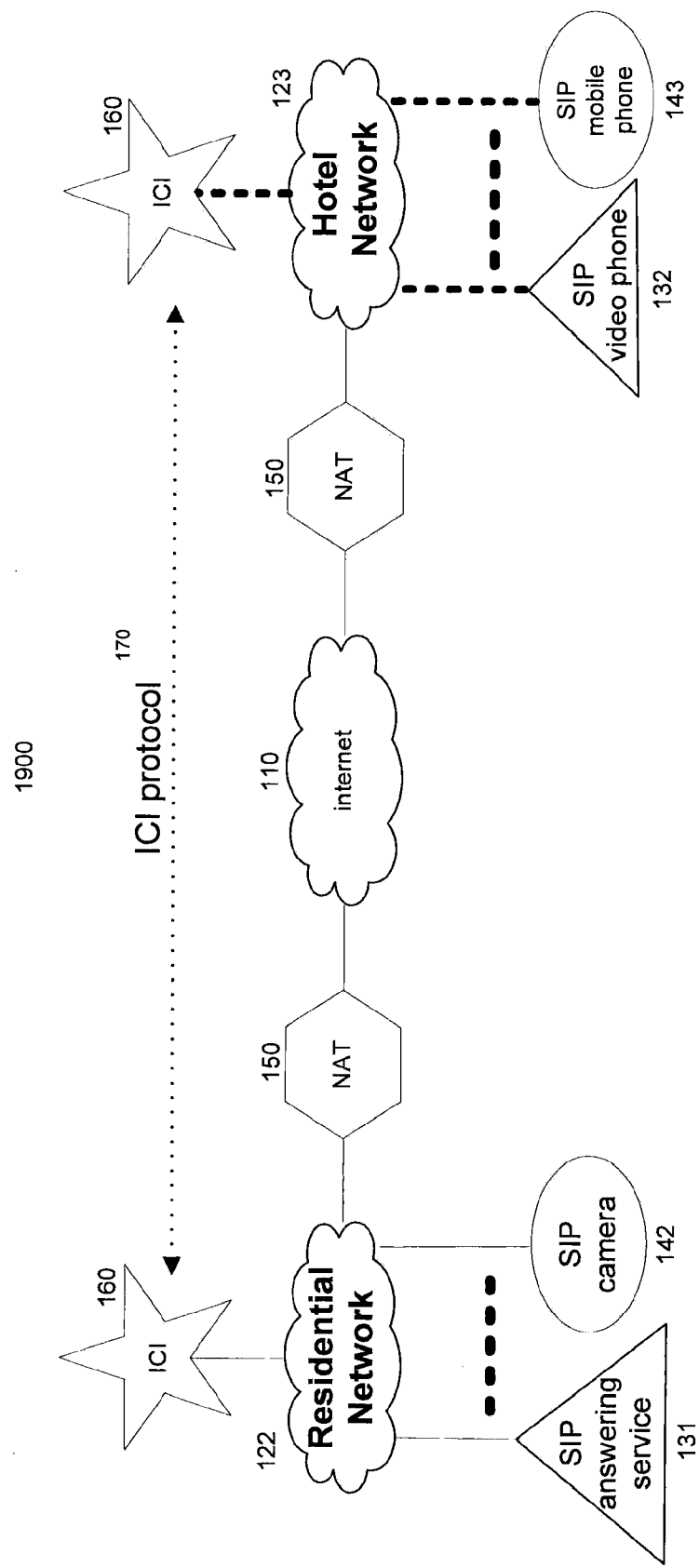
FIG. 19 depicts a network according to an embodiment of the invention.

FIG. 19 depicts a network 1900 according to an embodiment of the invention. This network 1900 has an overall configuration similar to that of the network 1500 in FIG. 15, but in this embodiment one of the local networks is a residential network 122 and another local network is a hotel network 123. This demonstrates a situation wherein a user who is traveling wishes to communicate with devices associated with a home network 122. For example, the residential network 122 may have an answering machine 131 and/or a security camera 142 capable of communicating via an ICI protocol 170. A user may use a device such as a video phone 132 and/or mobile phone 143 with the hotel network 123 to view camera 142 footage or check messages recorded by the answering machine 131.

Figure 20:
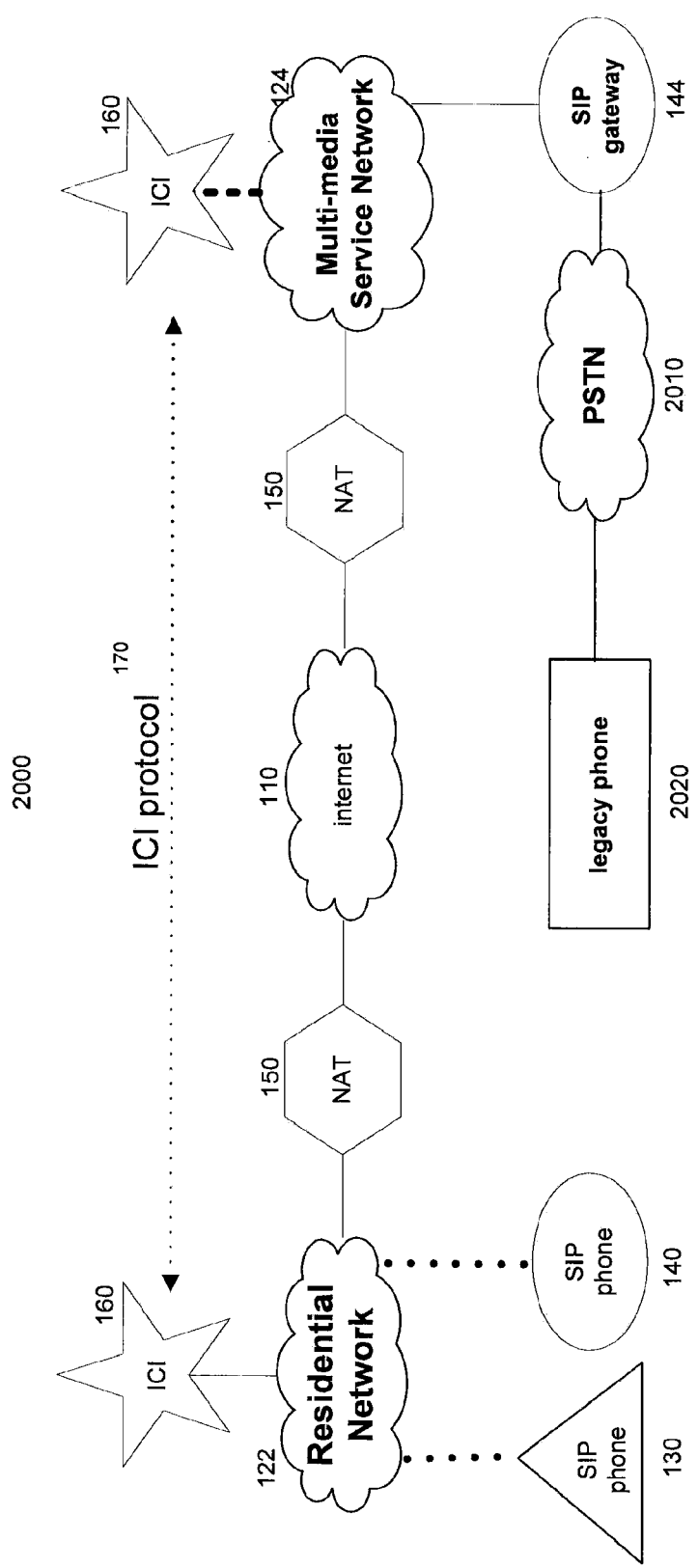
FIG. 20 depicts a network according to an embodiment of the invention.

FIG. 20 depicts a network 2000 according to an embodiment of the invention. This network 200 has an overall configuration similar to that of the network 1500 in FIG. 15, but in this embodiment one of the local networks is a residential network 122 and another local network is a multimedia service network 124. A multimedia service network 124 may be any kind of network providing multimedia content and/or access to external services. For example, the multimedia service network 124 in this network 2000 is associated with a SIP gateway 144. A SIP gateway 144 may be a computer that is capable of linking non-ICI compatible computers with an ICI 160 for communication via an ICI protocol 170. In this example network 2000, the SIP gateway 144 provides a connection to a public switched telephone network PTSN 2010. PTSN legacy phones 2020 and/or other PTSN 2010 compatible devices may communicate with other devices through the SIP gateway 144. For example, a SIP softphone 130 and/or SIP hardphone 140 associated with the residential network 122 may be able to call and/or receive calls from a legacy phone 2020 by communicating via ICI 160 with the SIP gateway 144.

Figure 21:
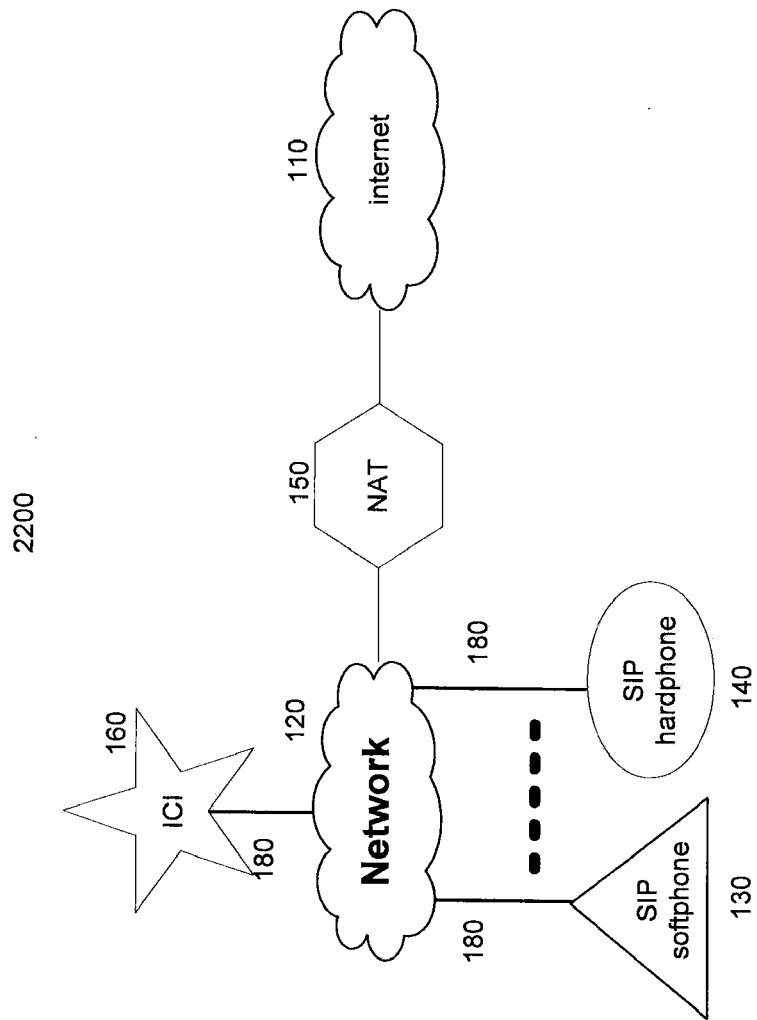
FIG. 21 depicts a network according to an embodiment of the invention.

FIG. 21 depicts a network 2200 according to an embodiment of the invention. In this example network 2200, a single local network 120 and public network 110 are shown, but those of ordinary skill in the relevant art will appreciate that additional networks may be combined with these networks in other embodiments. This network 2200 is an example of a network 2200 wherein all connections between devices on the local network 120 (such as the SIP softphone 130, SIP hardphone 140, and ICI 160) are wired connections 180.

Figure 22:
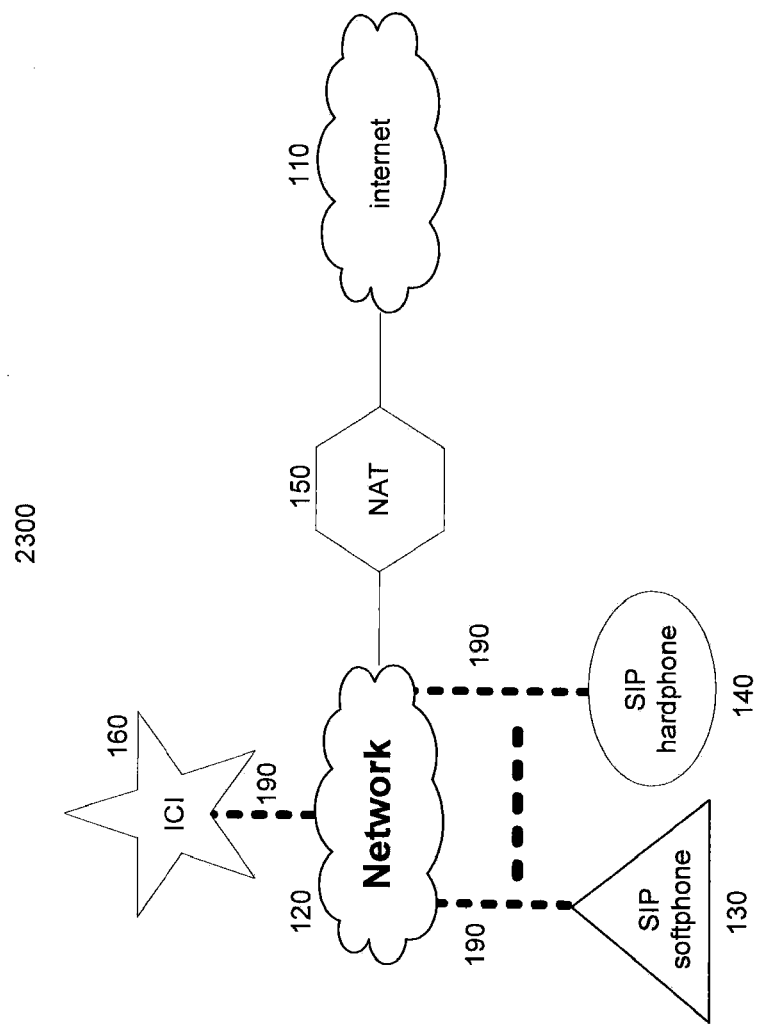
FIG. 22 depicts a network according to an embodiment of the invention.

FIG. 22 depicts a network 2300 according to an embodiment of the invention. This example network 2300 has an overall configuration similar to that of the network 2200 of FIG. 21, but in this embodiment all connections between devices on the local network 120 (such as the SIP softphone 130, SIP hardphone 140, and ICI 160) are wireless connections 190.

Figure 23:
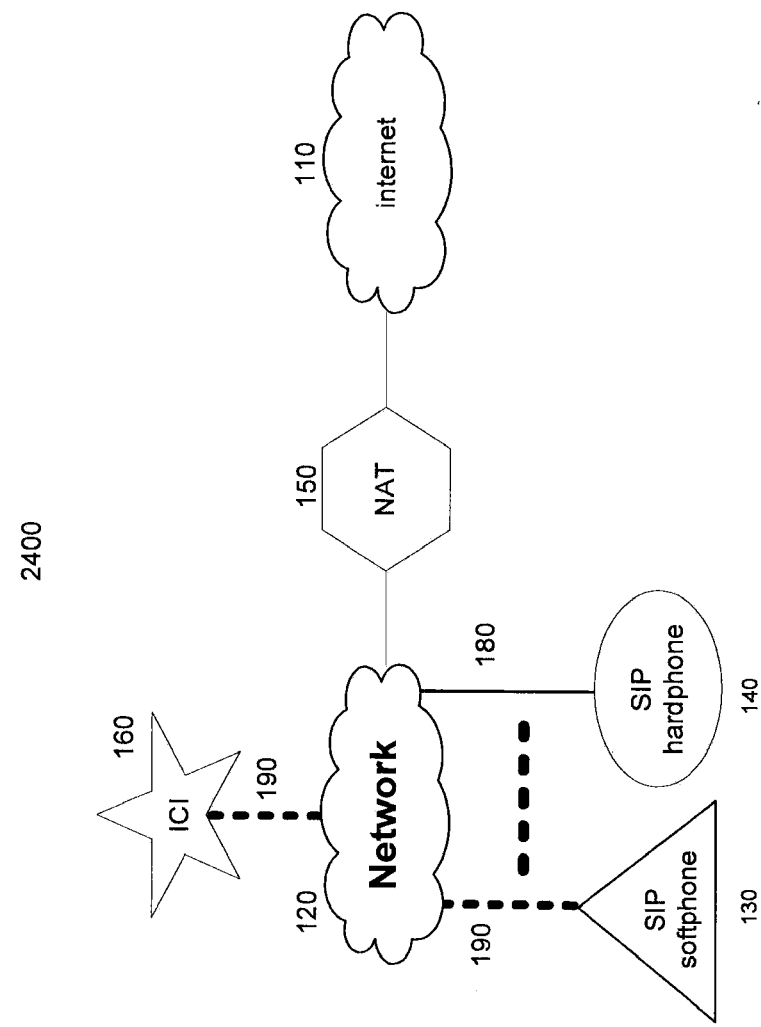
FIG. 23 depicts a network according to an embodiment of the invention.

FIG. 23 depicts a network 2400 according to an embodiment of the invention. This example network 2300 has an overall configuration similar to that of the network 2200 of FIG. 21, but in this embodiment some connections associated with the local network 120 are wired connections 180, and some connections associated with the local network 120 are wireless connections 190. For example, in this specific embodiment an ICI 160 and an SIP softphone 130 have wireless connections 190 to the network, and an SIP hardphone 140 has a wired connection 180 to the network.

Figure 24:
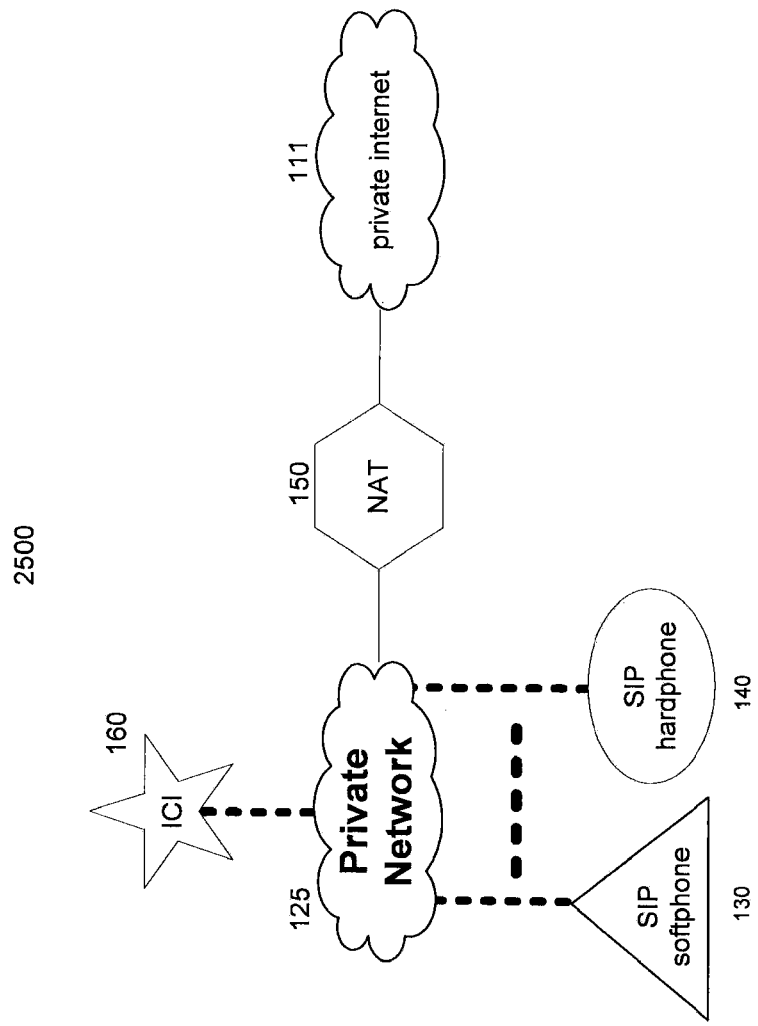
FIG. 24 depicts a network according to an embodiment of the invention.

FIG. 24 depicts a network 2500 according to an embodiment of the invention. This example network 2500 has an overall configuration similar to that of the network 2300 of FIG. 22. This network 2500 demonstrates an example wherein the local network is a private network 125 and the publicly accessible network is also a private network 111 of some type. For example, a password-protected private portion of the Internet or a private large scale corporate network may be associated with one or more local private networks 125. Devices 130,140 on the local private networks 125 may communicate with one another using ICI 160 and the private network 111.

Figure 25:
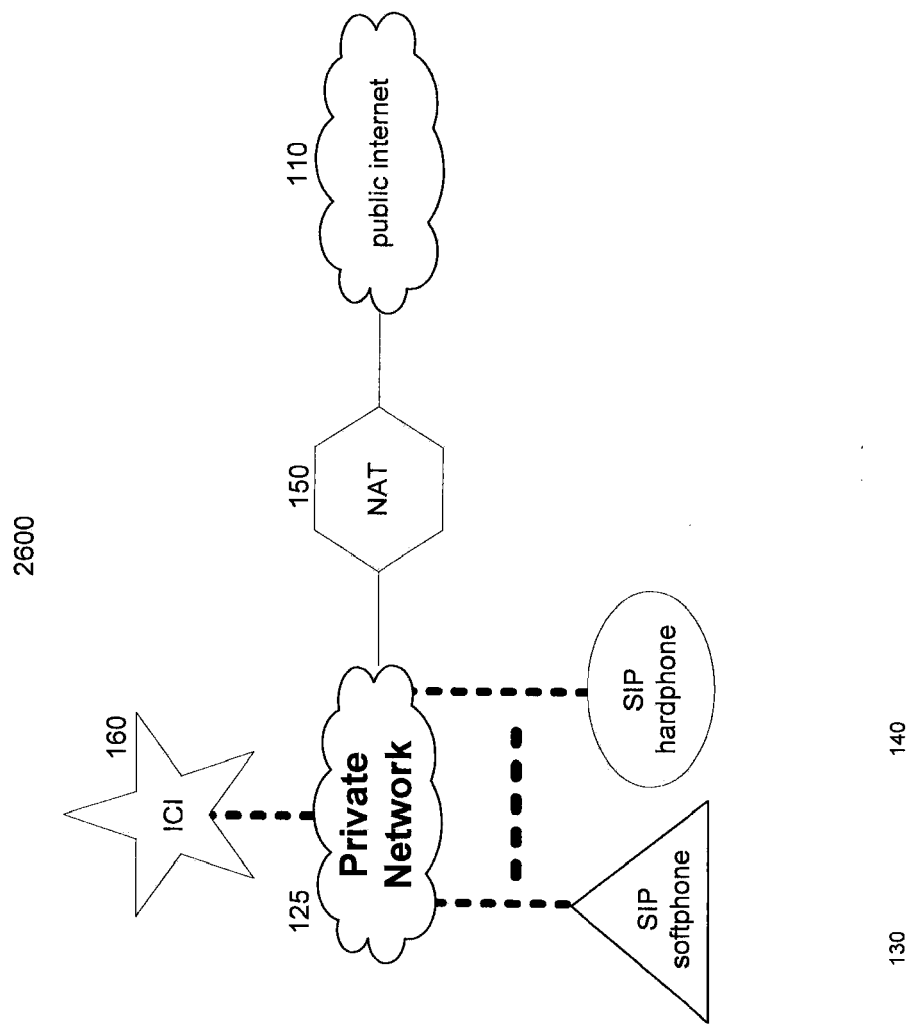
FIG. 25 depicts a network according to an embodiment of the invention.

FIG. 25 depicts a network 2600 according to an embodiment of the invention. This example network 2600 has an overall configuration similar to that of the network 2300 of FIG. 22. This network 2600 demonstrates an example wherein the local network is a private network 125 and the publicly accessible network is a broadly accessible public network such as the Internet 110.

Figure 26:
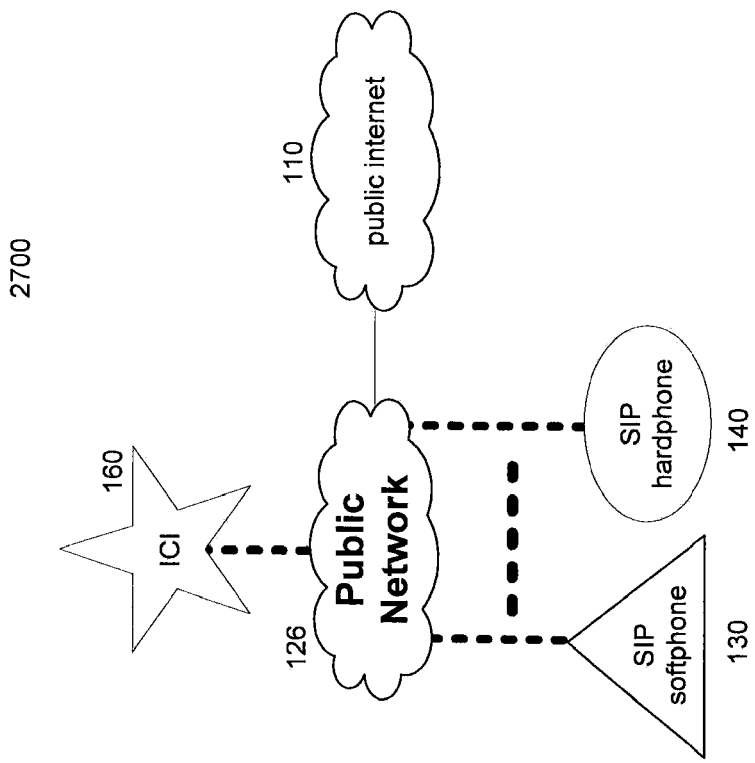
FIG. 26 depicts a network according to an embodiment of the invention.

FIG. 26 depicts a network 2700 according to an embodiment of the invention. This example network 2700 has an overall configuration similar to that of the network 2300 of FIG. 22, except that there is no NAT 150 between the local network and the public Internet 110. The local network in this example may be a public network 126 (such as a WiFi hotspot) or a network using security measures other than those provided by a NAT 150. Without the presence of a NAT 150 between a public network 126 and the public Internet 110, a device 130, 140 may have the same IP address within the local public network 126 and the public Internet 110. Even so, the ICI 160 may be used by such a device 130, 140 to communicate with other devices. Software associated with an ICI 160 may determine that swapping a public and private address as described in the connection processes above may be unnecessary for a device 130, 140 on a public network 126, and the ICI 160 may omit swapping for that device 130, 140.

Figure 27:
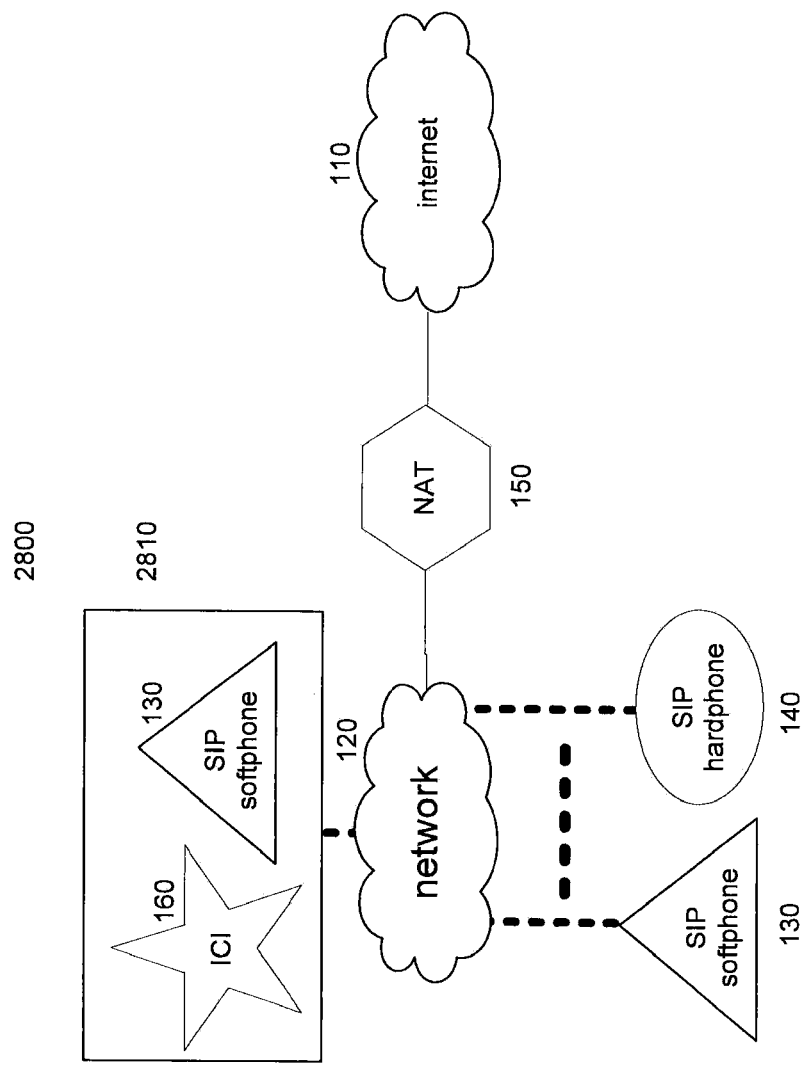
FIG. 27 depicts a network according to an embodiment of the invention.

FIG. 27 depicts a network 2800 according to an embodiment of the invention. This example network 2800 has an overall configuration similar to that of the network 2300 of FIG. 22, but the local network 120 is associated with a combination device 2810 comprising a SIP softphone 130 and ICI 160 in a single unit. A combination device 2810 may enable a user to communicate via ICI protocol 170 while connected to local networks 120 that do not have dedicated ICI 160 devices. In some embodiments, such a combination device 2810 may also allow other devices 130, 140 associated with the same local network 120 to communicate via ICI protocol 170 with devices on other networks using the combination device's 2810 ICI 160.

Figure 28:
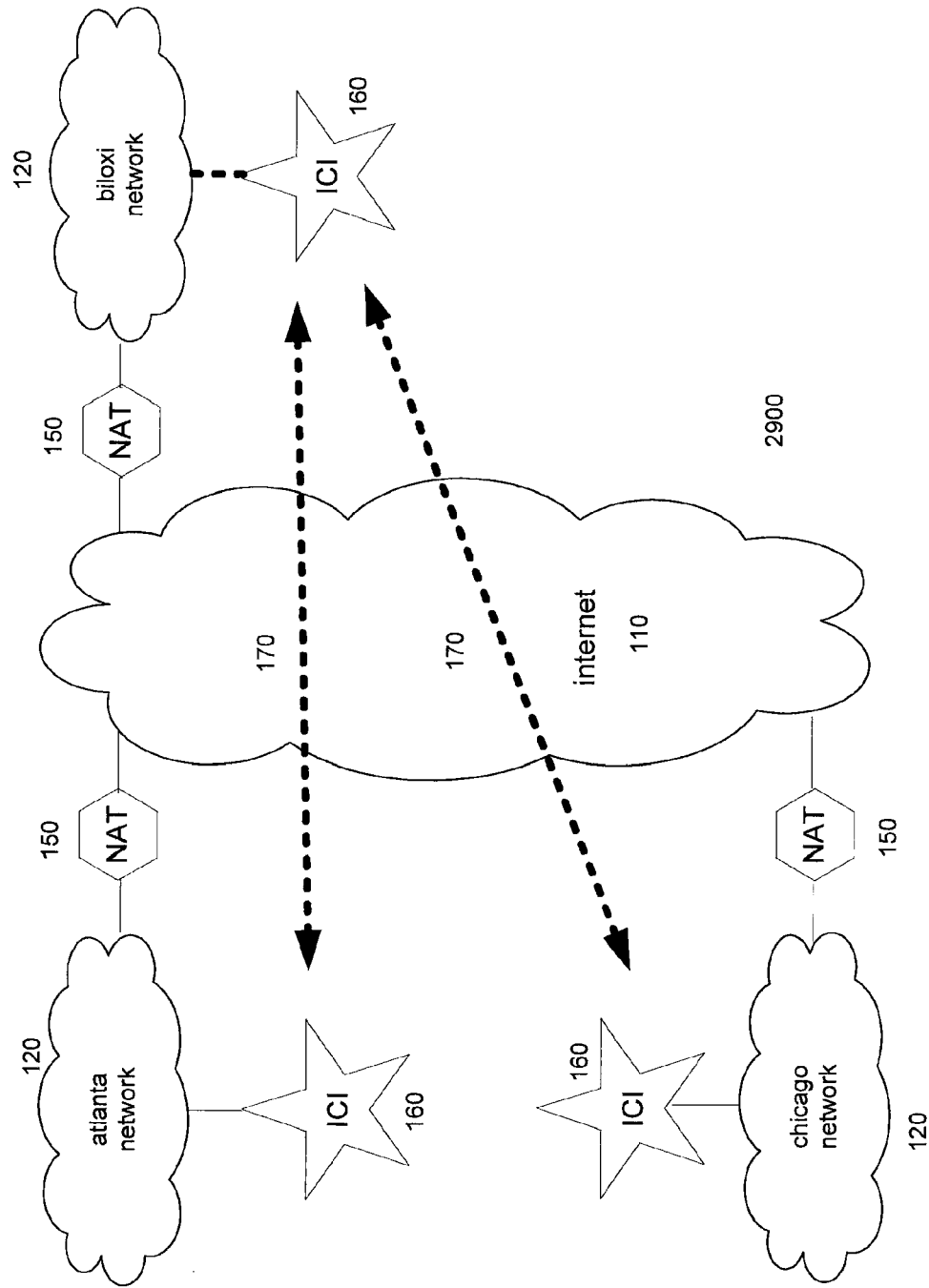
FIG. 28 depicts a network according to an embodiment of the invention.

FIG. 28 depicts a network 2900 according to an embodiment of the invention. In this network 2900, three local networks 120 (Atlanta, Biloxi, and Chicago) are shown and associated with the same larger Internet network 110. Each local network 120 in this example may have its own NAT 150 and ICI 160. In this example, devices on the Biloxi network 120 may communicate via ICI protocol 170 with devices on the Atlanta network 120 and/or the Chicago network 120, but devices on the Atlanta network 120 and devices on the Chicago network 120 may be unable to communicate with one another via ICI protocol 170. This may be because AORs of devices on the Atlanta network 120 and devices on the Chicago network 120 are unknown to one another, because of some security or other settings within ICI 160 software, or for some other reason. In some cases, any of the devices on any of the local networks 120 may be capable of connecting to one another, and this example may be illustrating an actual device on the Biloxi network 120 that is communicating with devices on the Atlanta network 120 and devices on the Chicago network 120, for example in a broadcast type communication. The Atlanta and Chicago devices may be able to communicate with the Biloxi device but not with one another. In one example, a connection between Biloxi and Chicago can be established when the Biloxi ICI 160 is already connected to Atlanta. Any number of concurrent connections may be possible for an ICI 160.

Figure 29:
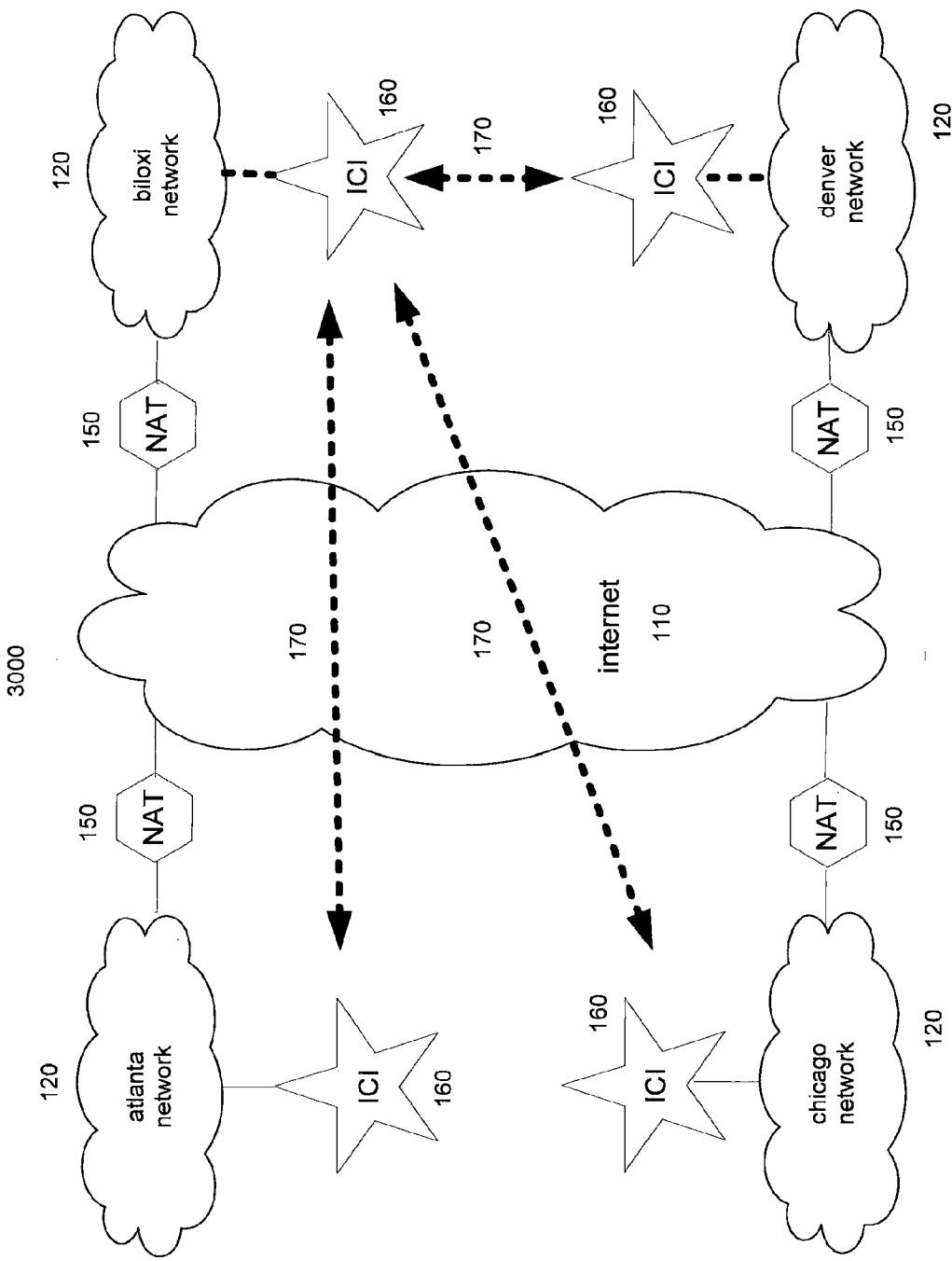
FIG. 29 depicts a network according to an embodiment of the invention.

FIG. 29 depicts a network 3000 according to an embodiment of the invention. This network 3000 has a similar overall configuration to the network 2900 of FIG. 28, but with a fourth local network 120 (Denver) having its own NAT 150 and ICI 160 added. In this example, devices on the Biloxi network 120 may communicate via ICI protocol 170 with devices on the Atlanta network 120, the Chicago network 120, and/or the Denver network 120, but devices on the Atlanta network 120, devices on the Chicago network 120, and devices on the Denver network 120 may be unable to communicate with one another via ICI protocol 170. In some cases, any of the devices on any of the local networks 120 may be capable of connecting to one another, and this example may be illustrating an actual device on the Biloxi network 120 that is communicating with devices on the Atlanta network 120, devices on the Chicago network 120, and devices on the Denver network 120, for example in a broadcast type communication. The Atlanta, Chicago, and Denver devices may be able to communicate with the Biloxi device but not with one another.

Figure 30:
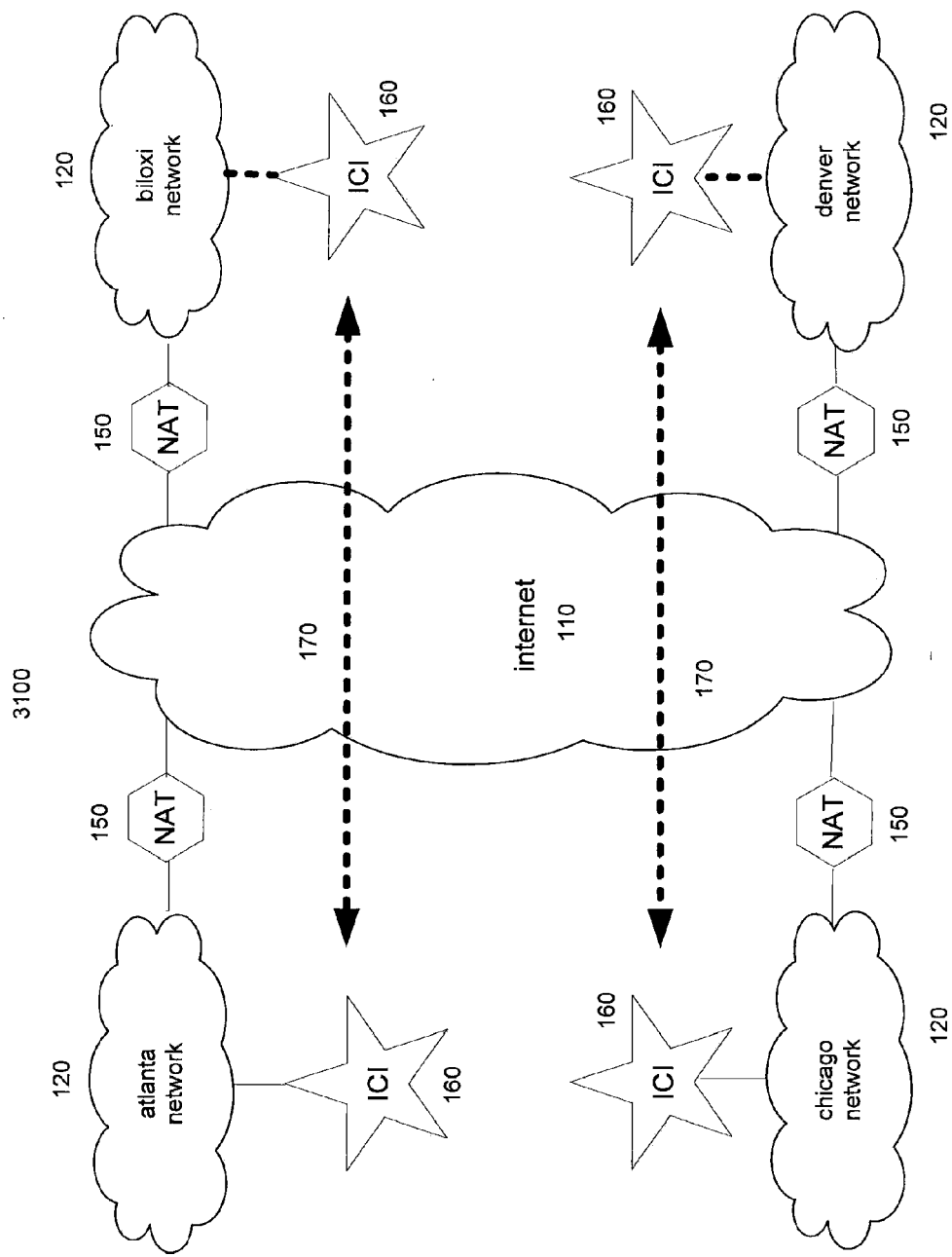
FIG. 30 depicts a network according to an embodiment of the invention.

FIG. 30 depicts a network 3100 according to an embodiment of the invention. This network 3100 has a similar overall configuration to the network 3000 of FIG. 29, but in this case the local network 120 ICIs 160 may be configured such that two separate, unrelated ICI protocol 170 channels may be available and/or active. In this example, devices on the Atlanta network 120 and devices on the Biloxi network 120 may be able to communicate with one another, and devices on the Chicago network 120 and devices on the Denver network 120 may be able to communicate with one another (i.e. a point to point configuration). However, communication between Atlanta and/or Biloxi devices and Chicago and/or Denver devices may be impossible or inactive.

Figure 31:
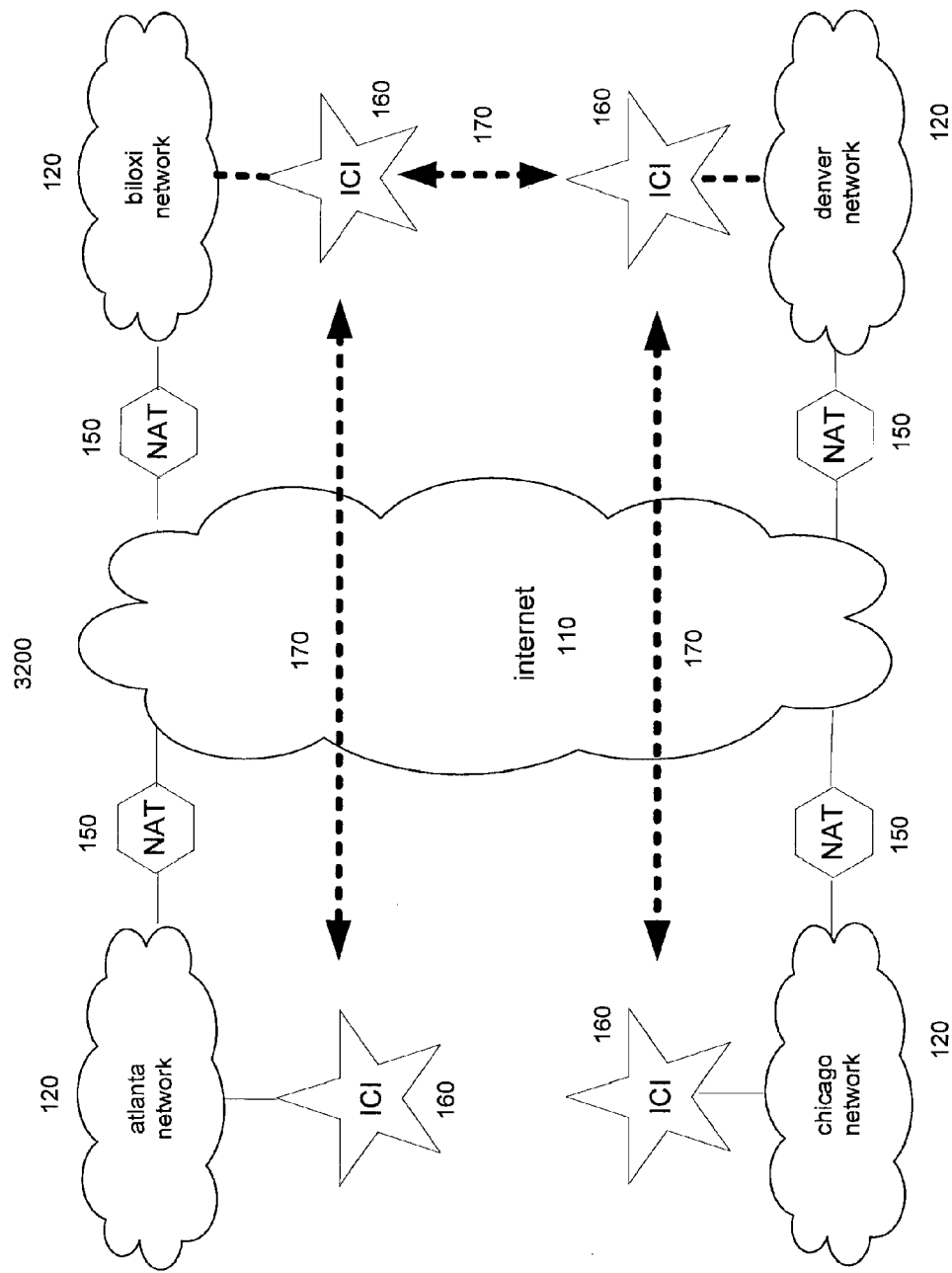
FIG. 31 depicts a network according to an embodiment of the invention.

FIG. 31 depicts a network 3200 according to an embodiment of the invention. This network 3200 has a similar overall configuration to the network 3100 of FIG. 30, but in this case Atlanta devices may communicate with Chicago devices and Biloxi devices may communicate with Denver devices. However, there is no available and/or active ICI protocol 170 communication between the Biloxi network 120 and the Chicago network 120 or between the Atlanta network 120 and the Denver network 120.

Figure 32:
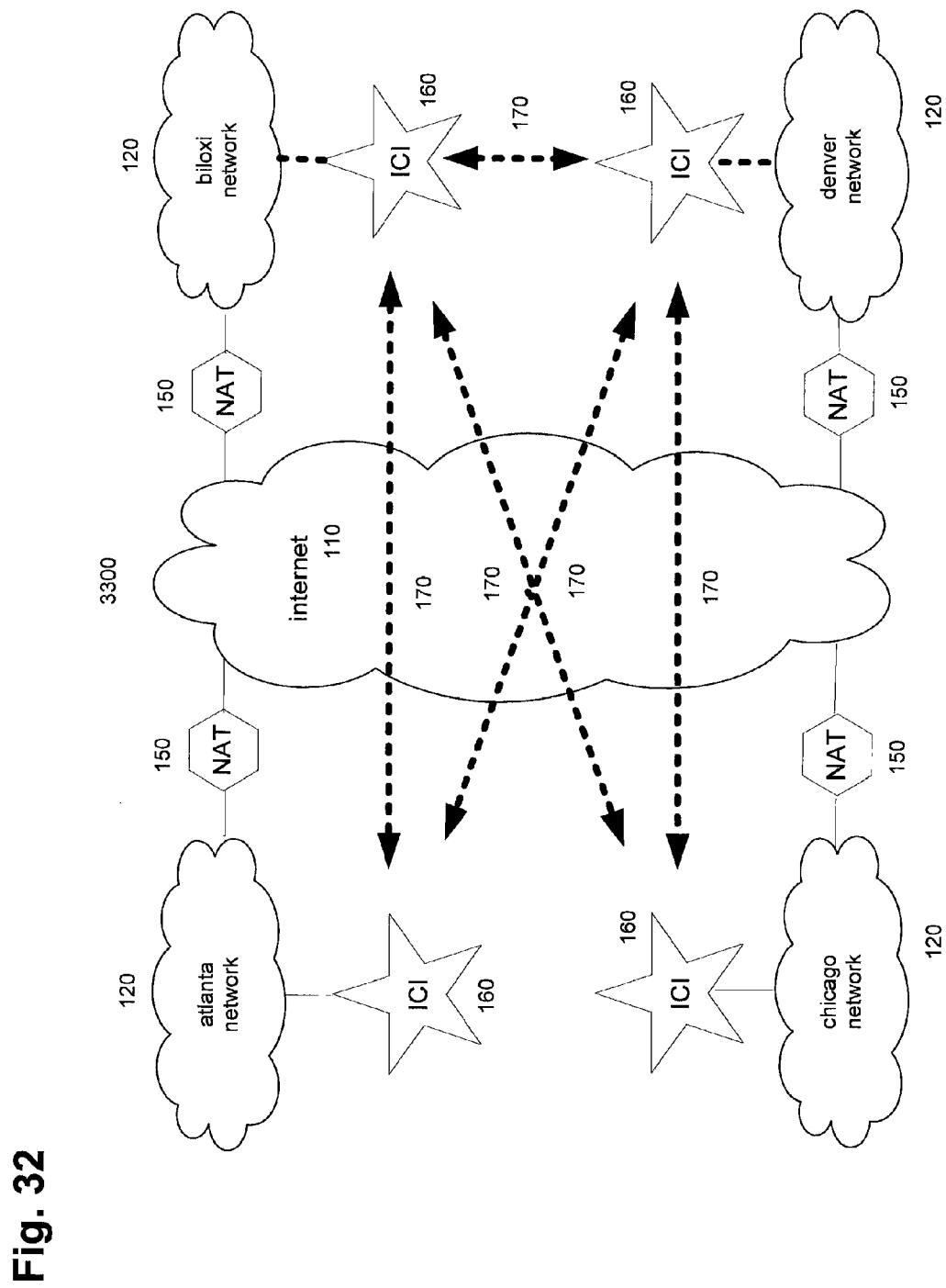
FIG. 32 depicts a network according to an embodiment of the invention.

FIG. 32 depicts a network 3300 according to an embodiment of the invention. This network 3300 has a similar overall configuration to the network 3100 of FIG. 30, but in this case devices on any local network 120 may communicate with devices on any other local network 120 (i.e. a fully meshed configuration). In this example, each ICI 160 has access to every other ICI 160, so any SIP device on any local network 120 may connect to any other SIP device on any local network 120. In such an embodiment, or any embodiment with an ICI 160 having multiple active connections, SIP device location lookup processes may be performed through dynamic hash table lookups of linked ICIs 160 in the meshed network.

Figure 33:
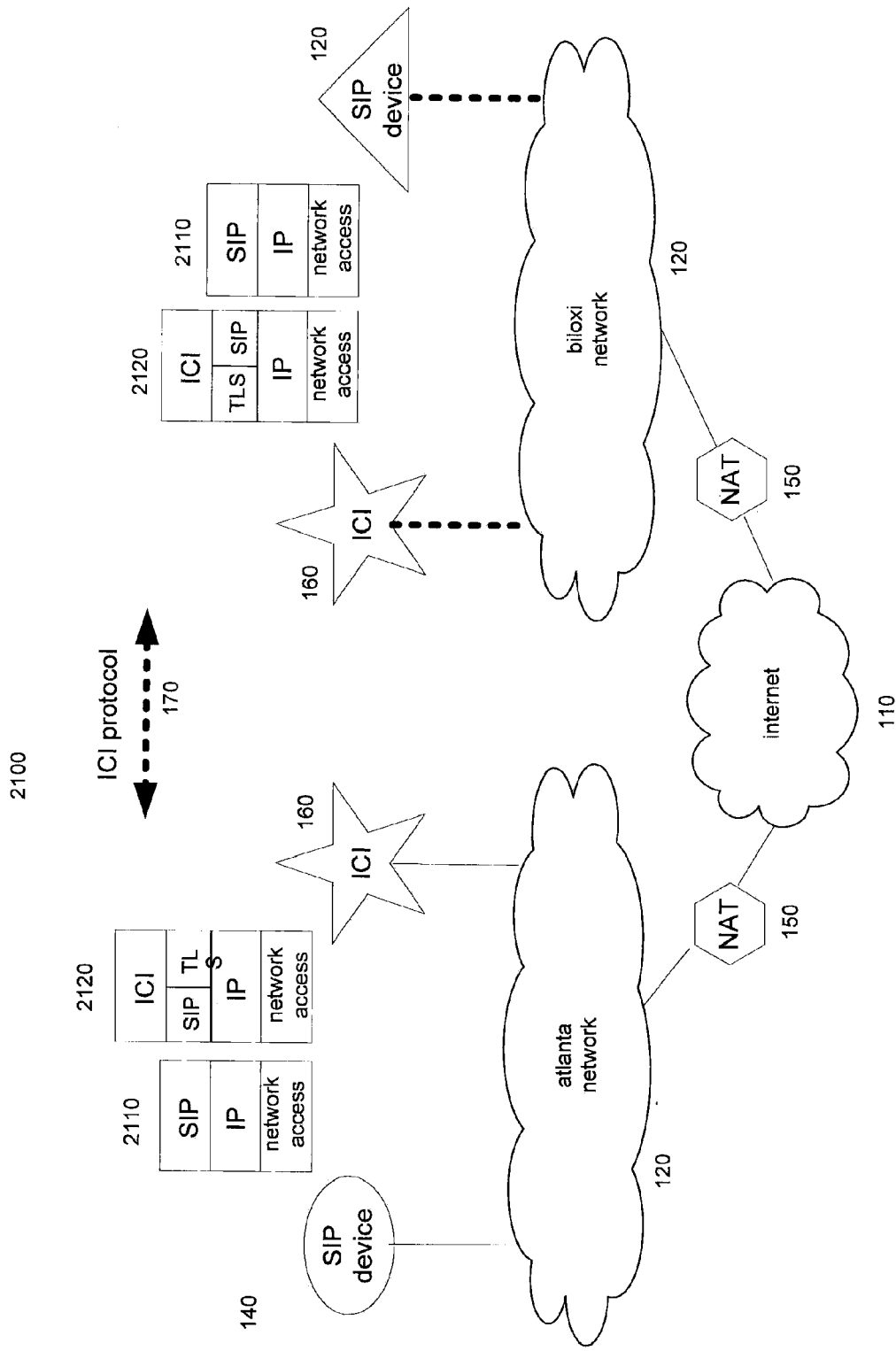
FIG. 33 depicts a network according to an embodiment of the invention.

FIG. 33 depicts a network 2100 according to an embodiment of the invention. This network 2100 example includes a public Internet 110 and two private networks 120 (Atlanta and Biloxi). Each private network 120 has a communication device 120, 140, a NAT 150, and an ICI 160. FIG. 33 also illustrates sample protocol stacks for this embodiment. For example, the stack 2110 between a device 130, 140 and a local network 120 may comprise an SIP protocol layer, an IP layer, and a network access data link layer such as a wired or wireless connection. This protocol stack 2110 may be used for communications between the SIP devices 130, 140 and the ICI device 160. Data transmitted between a device 130, 140 and a local network 120 may also be transmitted between the local network 120 and an ICI 160. A stack 2120 between the local network 120 and ICI 160 may comprise an SIP protocol layer, an IP layer, and a network access data link layer such as a wired or wireless connection. The stack 2120 between the local network 120 and ICI 160 may also comprise transport layer security (TLS) or some other cryptographic protocol in the transport layer and an ICI protocol 170 enabling the ICI communications discussed above. The TLS or other cryptographic protocol may provide security for ICI communications sent through the Internet 110 or other public network. This protocol stack 2120 may be used for communications between ICIs 160.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method for communicating data via a network, the method comprising:
   activating a server mode for a first communication device;
   receiving, with the first communication device when the first communication device is in the server mode, a message from a second communication device, the message comprising an identity associated with the second communication device;
   retrieving, with the first communication device, a key associated with the second communication device, wherein the key is located in a database associated with the first communication device;
   verifying, with the first communication device, the identity associated with the second communication device by comparing data in the message from the second communication device with data in the key associated with the second communication device;
   activating a client mode for the first communication device; and
   sending, with the first communication device when the first communication device is in the client mode, a message to an address associated with the second communication device, the message comprising an identity associated with the first communication device.

2. The method of claim 1, further comprising:
   retrieving, with the first communication device, a known address associated with the second communication device, wherein the known address is located in the database associated with the first communication device; wherein
   the sending, with the first communication device when the first communication device is in the client mode, comprises sending a message to the known address.

3. The method of claim 2, further comprising:
   receiving the known address associated with the second communication device; and
   storing the known address in the database.

4. The method of claim 1, further comprising:
receiving the key associated with the second communication device; and
storing the key in the database.

5. The method of claim 1, wherein the key associated with the second communication device is also associated with a display device in communication with the second communication device.

6. The method of claim 1, further comprising:
receiving, with the first communication device, a content message from the second communication device; and
sending, with the first communication device, the content message from the second communication device to a display device in communication with the first communication device.

7. The method of claim 1, further comprising:
receiving, with the first communication device, a content message to the address associated with the second communication device from a display device in communication with the first communication device; and
sending, with the first communication device, the content message to the second communication device.

8. The method of claim 1, further comprising determining an address associated with the first communication device.

9. The method of claim 8, wherein determining the address associated with the first communication device comprises receiving the address from a public address server.

10. The method of claim 1, further comprising sending an address associated with the first communication device to the second communication device.

11. The method of claim 1, further comprising sending a key associated with the first communication device to the second communication device.

12. The method of claim 11, wherein the key associated with the first communication device is also associated with a display device in communication with the first communication device.

13. The method of claim 1, wherein the first communication device uses a session initiation protocol to perform the sending and the receiving.

14. The method of claim 1, further comprising:
directing, with the first communication device, a Network Address Translation (NAT) device in communication with the first communication device to open a port;
wherein the receiving and sending are carried out via the open port in the NAT device.

15. The method of claim 14, wherein the receiving and sending comprise receiving and sending data to establish a secure socket layer connection between the first communication device and the second communication device.

16. The method of claim 1, further comprising refusing a connection request from the second communication device when the comparing indicates that the data in the message from the second communication device does not match the data in the key associated with the second communication device.

17. A communication device comprising:
a database; and
a processor in communication with the database; the processor constructed and arranged to:
send and receive data via a network;
activate a server mode;
receive, when the server mode is active, a message from a remote communication device via the network, the message comprising an identity associated with the remote communication device;
retrieve, from the database, a key associated with the remote communication device;
verify the identity associated with the remote communication device by comparing data in the message from the remote communication device with data in the key associated with the remote communication device;
activate a client mode; and
send, when the client mode is active, a message to an address associated with the remote communication device via the network, the message comprising an identity associated with the communication device.

18. The communication device of claim 17, wherein the processor is further constructed and arranged to:
retrieve, from the database, a known address associated with the remote communication device; wherein
the sending, when the client mode is active, comprises sending a message to the known address via the network.

19. The communication device of claim 18, wherein the processor is further constructed and arranged to:
receive the known address associated with the remote communication device; and
store the known address in the database.

20. The communication device of claim 17, wherein the processor is further constructed and arranged to:
receive the key associated with the remote communication device; and
store the key in the database.

21. The communication device of claim 17, wherein the key associated with the remote communication device is also associated with a display device in communication with the remote communication device.

22. The communication device of claim 17, wherein:
the processor is in communication with a display device via a local network; and
the processor is further constructed and arranged to send a content message from the remote communication device to the display device.

23. The communication device of claim 22, wherein:
the message from the remote communication device comprises a display device address associated with the local network; and
sending the content message from the remote communication device to the display device comprises sending the content message to the display device address on the local network.

24. The communication device of claim 22, wherein the processor is further constructed and arranged to:
receive a content message to the address associated with the remote communication device from the display device; and
send the content message to the remote communication device via the network.

25. The communication device of claim 17, further comprising:
a display in communication with the processor, wherein:
the processor is further constructed and arranged to send a content message from the remote communication device to the display.

26. The communication device of claim 25, wherein the processor is further constructed and arranged to send a content message to the address associated with the remote communication device to the remote communication device via the network.

27. The communication device of claim 17, wherein the processor is further constructed and arranged to determine an address associated with the communication device.

28. The communication device of claim 27, wherein determining the address associated with the communication device comprises receiving the address from a public address server via the network.

29. The communication device of claim 17, wherein the processor is further constructed and arranged to send an address associated with the communication device to the remote communication device.

30. The communication device of claim 17, wherein the processor is further constructed and arranged to send a key associated with the communication device to the remote communication device.

31. The communication device of claim 19, wherein the key associated with the communication device is also associated with a display device in communication with the processor via a local network.

32. The communication device of claim 17, wherein the processor uses a session initiation protocol to perform the sending and the receiving.

33. The communication device of claim 17, wherein the processor is further constructed and arranged to:
   direct a Network Address Translation (NAT) device in communication with the communication device to open a port;
   wherein the receiving and sending via the network are carried out via the open port in the NAT device.

34. The communication device of claim 33, wherein the receiving and sending comprise receiving and sending data to establish a secure socket layer connection between the communication device and the remote communication device.

35. The communication device of claim 17, wherein the processor is further constructed and arranged to refuse a connection request from the remote communication device when the comparing indicates that the data in the message from the remote communication device does not match the data in the key associated with the remote communication device.

36. A network comprising:
   a network address translation (NAT) device constructed and arranged to send and receive communications via an outside network; and
   a communication device in communication with the NAT device, the communication device being constructed and arranged to:
   activate a server mode;
   receive, when the server mode is active, a message from a remote communication device via the NAT device and the outside network, the message comprising an identity associated with the remote communication device;
   retrieve a key associated with the remote communication device;
   verify the identity associated with the remote communication device by comparing data in the message from the remote communication device with data in the key associated with the remote communication device;
   activate a client mode; and
   send, when the client mode is active, a message to an address associated with the remote communication device via the NAT device and the outside network, the message comprising an identity associated with the communication device.

37. The network of claim 36, wherein the communication device is further constructed and arranged to:
   retrieve a known address associated with the remote communication device; wherein
   the sending, when the client mode is active, comprises sending a message to the known address via the NAT device and the outside network.

38. The network of claim 36, wherein the key associated with the remote communication device is also associated with a display device in communication with the remote communication device.

39. The network of claim 36, further comprising a display device in communication with the communication device.

40. The network of claim 39, wherein
   the message from the remote communication device comprises a display device address associated with the network; and
   the communication device is further constructed and arranged to send a content message from the remote communication device to the display device by sending the content message to the display device address on the local network.

41. The network of claim 39, wherein the communication device is constructed and arranged to receive a content message to the address associated with the second communication device from the display device.

42. The network of claim 36, wherein the communication device is further constructed and arranged to determine an address associated with the communication device by receiving the address from a public address server via the NAT device and the outside network.

43. The network of claim 36, wherein the communication device uses a session initiation protocol to perform the sending and the receiving.

44. The network of claim 36, wherein the communication device is further constructed and arranged to:
   direct the NAT device to open a port;
   wherein the receiving and sending via the NAT device are carried out via the open port in the NAT device.

45. The network of claim 44, wherein the receiving and sending comprise receiving and sending data to establish a secure socket layer connection between the communication device and the remote communication device.

46. The network of claim 26, wherein the communication device is further constructed and arranged to refuse a connection request from the remote communication device when the comparing indicates that the data in the message from the remote communication device does not match the data in the key associated with the remote communication device.

* * * * *